US012570454B2

(12) United States Patent
Wetsch

(10) Patent No.: US 12,570,454 B2
(45) Date of Patent: Mar. 10, 2026

(54) PROTECTIVE ARTICLE WITH CELLULOSE-BASED EXPANDABLE COMPOSITE

(71) Applicant: Pregis LLC, Chicago, IL (US)

(72) Inventor: Thomas D. Wetsch, Naples, FL (US)

(73) Assignee: Pregis LLC, Chicago, IL (US)

( * ) Notice: Subject to any disclaimer, the term of this patent is extended or adjusted under 35 U.S.C. 154(b) by 0 days.

(21) Appl. No.: 17/515,279

(22) Filed: Oct. 29, 2021

(65) Prior Publication Data

US 2022/0135309 A1 May 5, 2022

Related U.S. Application Data

(60) Provisional application No. 63/107,412, filed on Oct. 29, 2020.

(51) Int. Cl.
B65D 65/40 (2006.01)
B32B 37/14 (2006.01)
(Continued)

(52) U.S. Cl.
CPC .............. B65D 81/03 (2013.01); B32B 37/14 (2013.01); B32B 37/144 (2013.01); B65D 65/40 (2013.01);
(Continued)

(58) Field of Classification Search
CPC ............... B65D 81/38; B65D 81/3848; B65D 81/3853; B65D 81/3855; B65D 81/027;
(Continued)

(56) References Cited

U.S. PATENT DOCUMENTS 3,460,740 A 8/1969 Hagen
3,941,634 A * 3/1976 Nisser ................... B32B 29/005
428/313.5
(Continued)

FOREIGN PATENT DOCUMENTS

EP 1328602 B1 7/2003
EP 1590145 B1 11/2005
(Continued)

OTHER PUBLICATIONS

Dow, Technical Data Sheet, HYPOD 8503 Polyolefin Dispersion for Textile and Nonwoven Substrate Applications, Dec. 2014.
(Continued)

*Primary Examiner* — Michael C. Romanowski

(57) ABSTRACT

This invention relates to a protective article comprising first and second walls. Each of the walls includes superimposed plies enclosing an expansion space therebetween, and an expandable composite disposed in the expansion space. The expandable composite includes a biodegradable matrix, and a plurality of cellulose-based expandable microspheres. The expandable microspheres are configured to cause the biodegradable matrix to expand upon activation of the expandable microspheres. The invention further relates to an expandable web comprising a first ply, second ply and an expandable composite deposited between the first ply and the second ply. The invention further relates to a method for making an expandable protective article.

22 Claims, 14 Drawing Sheets

(51) Int. Cl.
 *B65D 65/46* (2006.01)
 *B65D 75/42* (2006.01)
 *B65D 81/03* (2006.01)
(52) U.S. Cl.
 CPC ........... *B65D 65/466* (2013.01); *B65D 75/42*
 (2013.01); *B32B 2264/203* (2020.08); *B32B 2553/02* (2013.01)
(58) Field of Classification Search
 CPC ...... B65D 81/051; B65D 81/263; B65D 9/26;
 B65D 51/16; B65D 65/42; B65D 65/44;
 B65D 65/466; B65D 75/20; B65D 75/28;
 B65D 75/30; B32B 2264/06; B32B
 2264/062; B32B 2264/04; B32B
 2264/203
 USPC ...................... 383/1, 3, 102; 428/34.1–36.92
 See application file for complete search history.

(56) References Cited

U.S. PATENT DOCUMENTS

| | | | |
|---|---|---|---|
| 3,948,436 A | | 4/1976 | Bambara |
| 4,193,499 A | | 3/1980 | Lookholder |
| 4,620,633 A | | 11/1986 | Lookholder |
| 4,824,823 A | * | 4/1989 | Pietsch .................. B41M 5/165 |
| | | | 503/201 |
| 4,927,010 A | | 5/1990 | Kannankeril |
| 6,451,876 B1 | | 9/2002 | Koshy |
| 6,509,384 B2 | | 1/2003 | Kron et al. |
| 6,740,373 B1 | * | 5/2004 | Swoboda ............... B65D 65/42 |
| | | | 428/514 |
| 7,119,149 B2 | | 10/2006 | Ferguson et al. |
| 7,919,555 B2 | | 4/2011 | Agarwal et al. |
| 8,288,447 B2 | | 10/2012 | Muenz et al. |
| 8,529,723 B2 | | 9/2013 | Fu et al. |
| 8,747,603 B2 | | 6/2014 | Huang et al. |
| 9,056,712 B2 | | 6/2015 | Cook et al. |
| 9,249,269 B2 | * | 2/2016 | Biggin .................. B32B 15/046 |
| 9,273,230 B2 | | 3/2016 | Huang et al. |
| 9,522,772 B2 | | 12/2016 | Fu et al. |
| 9,580,629 B2 | | 2/2017 | Huang et al. |
| 9,591,937 B2 | | 3/2017 | Fu et al. |
| 9,648,969 B2 | | 5/2017 | Fu et al. |
| 9,657,200 B2 | | 5/2017 | Huang et al. |
| 9,771,499 B2 | | 9/2017 | Huang et al. |
| 9,849,655 B2 | | 12/2017 | Huang et al. |
| 9,977,423 B2 | | 5/2018 | Wetsch et al. |
| 10,099,459 B2 | | 10/2018 | Huang et al. |
| 10,100,204 B2 | | 10/2018 | Huang et al. |
| 10,100,231 B2 | | 10/2018 | Huang et al. |
| 10,183,458 B2 | | 1/2019 | Fu et al. |
| 10,208,429 B2 | | 2/2019 | Huang et al. |
| 10,266,361 B2 | | 4/2019 | Bertram et al. |
| 10,336,920 B2 | | 7/2019 | Ellis et al. |
| 10,501,252 B1 | | 12/2019 | Mahler et al. |
| 11,166,457 B1 | * | 11/2021 | Zou ........................... A01P 5/00 |
| 11,773,297 B2 | * | 10/2023 | McLeod ............... C08J 9/0052 |
| | | | 162/124 |
| 11,833,788 B2 | * | 12/2023 | Bochnia .................. B32B 27/08 |
| 2004/0000581 A1 | | 1/2004 | Brandolini |
| 2004/0005100 A1 | | 1/2004 | Versluys |
| 2004/0228886 A1 | * | 11/2004 | Ding .................... A61K 8/8152 |
| | | | 424/401 |
| 2005/0152624 A1 | | 7/2005 | Versluys |
| 2008/0289302 A1 | | 11/2008 | Vulpitta |
| 2010/0092758 A1 | | 4/2010 | Slovencik |
| 2012/0048450 A1 | * | 3/2012 | Fu ........................... B29C 35/10 |
| | | | 427/557 |
| 2013/0101826 A1 | | 4/2013 | Haug et al. |
| 2014/0087177 A1 | | 3/2014 | Huang et al. |
| 2017/0204302 A1 | | 7/2017 | Huang et al. |
| 2017/0291965 A1 | | 10/2017 | Schmidt et al. |

| | | | |
|---|---|---|---|
| 2017/0361573 A1 | * | 12/2017 | Malmgren ............. D21H 21/54 |
| 2017/0361595 A1 | | 12/2017 | Soundararajan et al. |
| 2018/0148246 A1 | * | 5/2018 | Fu ........................... B32B 29/02 |
| 2019/0031415 A1 | | 1/2019 | Kumar |
| 2019/0062028 A1 | * | 2/2019 | Getty ...................... B32B 27/10 |
| 2019/0136456 A1 | | 5/2019 | Huang et al. |
| 2019/0218419 A1 | | 7/2019 | McLeod et al. |
| 2019/0218429 A1 | | 7/2019 | Huang et al. |
| 2019/0218720 A1 | | 7/2019 | Huang et al. |
| 2019/0241776 A1 | | 8/2019 | Rowitsch et al. |
| 2019/0270917 A1 | | 9/2019 | Ellis et al. |
| 2019/0284438 A1 | | 9/2019 | McLeod et al. |
| 2020/0317414 A1 | | 10/2020 | Cooper et al. |
| 2021/0060889 A1 | | 3/2021 | Kannankeril |
| 2022/0032598 A1 | | 2/2022 | Wetsch |
| 2022/0363859 A1 | * | 11/2022 | Andreasson ........... B01J 13/125 |
| 2023/0220177 A1 | * | 7/2023 | Andreasson ........... C08J 9/0061 |
| | | | 521/57 |

FOREIGN PATENT DOCUMENTS

| | | | |
|---|---|---|---|
| EP | 2046890 | B1 | 4/2009 |
| EP | 2614124 | B1 | 7/2013 |
| EP | 3074479 | B1 | 10/2016 |
| EP | 3575490 | A1 | 12/2019 |
| JP | 2016505095 | A | 2/2016 |
| JP | 2017503039 | A | 1/2017 |
| JP | 2018509473 | A | 4/2018 |
| JP | 2019065162 | A | 4/2019 |
| WO | 2002031077 | A2 | 4/2002 |
| WO | 2004000548 | A1 | 12/2003 |
| WO | 2004062869 | A2 | 7/2004 |
| WO | 2007025007 | A1 | 3/2007 |
| WO | 2007091961 | A1 | 8/2007 |
| WO | 2007112294 | A1 | 10/2007 |
| WO | 2007143646 | A2 | 12/2007 |
| WO | 2012033998 | A2 | 3/2012 |
| WO | 2014051876 | A1 | 4/2014 |
| WO | 2014078071 | A1 | 5/2014 |
| WO | 2014116395 | A1 | 7/2014 |
| WO | 2014118083 | A1 | 8/2014 |
| WO | 2015081097 | A1 | 6/2015 |
| WO | 2016014486 | A1 | 1/2016 |
| WO | 2016154240 | A1 | 9/2016 |
| WO | 2019018523 | A1 | 1/2019 |
| WO | 2019022988 | A1 | 1/2019 |
| WO | 2019040624 | A1 | 2/2019 |
| WO | 2019140065 | A1 | 7/2019 |
| WO | 2020099440 | A1 | 5/2020 |

OTHER PUBLICATIONS

Dow, Technical Data Sheet, HYPOD 8501 Polyolefin Dispersion Enableed with Bluewave Technology for Paper and Paperbond Applications, Oct. 2012.
Rao, et al., Polyolefin Dispersion, A New Vistas for Flexible Packaging, Tappi Place Conferences, Nov. 2009.
International Search Report and Written Opinion for International Application No. PCT/US21/57446, filed Oct. 29, 2021, mailed Feb. 9, 2022.
Li, et al., Alkenyl aromatic polymer microspheres via g-ray irraditation-assisted self-assembly after free-radical polymerization, Radiation Physics and Chemistry, 2018, https://doi.org/10.1016/J.radphyschem. 2018.06.029) (Year: 2018).
Mohanty et al., Transition Metal-Catalyzed Functionalization of Polyolefins Containing C—C, C=C, and C—H Bonds, Advances in Organometallic Chemistry, Vo. 64, 2015, http://dx.doi.org/10.1016/bs.admoc.2015.08.002) (Year: 2015).
Dow Introduces HYPOD Polyolefin Dispersions—Breakthrough Technology Used to Make Waterborne Dispersions of Polymers, Dow, Jul. 11, 2007, [online], http://news.dow.com/prodbus/20070711 b.htm (Year: 2007).

* cited by examiner

PROTECTIVE ARTICLE WITH CELLULOSE-BASED EXPANDABLE COMPOSITE

REFERENCE TO RELATED APPLICATIONS

The present application claims the benefit of U.S. Provisional Application No. 63/107,412 flied Oct. 29, 2020, which is hereby incorporated herein by reference in its entirety.

FIELD OF THE INVENTION

The present disclosure relates generally to cellulose-based expandable composites that, once expanded, provide thermal insulation, sound insulation, cushioning, or a combination thereof. Additionally, the present disclosure relates to a process and apparatus for producing the cellulose-based expandable composites and methods of using the cellulose-based expandable composites.

BACKGROUND

Traditional low-density protective packaging is produced in standard bulky, low-density configurations. These bulky, low-density configurations may include, for example, pre-formed and inflated fluid chambers (e.g., bubble wrap), pre-expanded foam, the insertion of padding, etc. These bulky, low-density configurations provide packaging support during shipment. Before they can be used in packaging, however, they must be shipped to the packaging and shipment locations.

Since traditional protective packaging is produced already in bulky, low-density configurations, it must be transported as such. This increases the total volume of the packaging material even before it is used for packaging, thus increasing shipping costs of the packaging material to packaging and shipment locations and decreasing the amount of product that can be stored at these locations until use is needed.

For at least these reasons, systems and methods for producing packaging material in a low volume, high-density configuration which can then be expanded at a later time is needed.

SUMMARY

According to various embodiments of the present disclosure, a protective article is provided. The protective article includes first and second walls. Each of the walls includes superimposed plies enclosing an expansion space therebetween, and an expandable composite disposed in the expansion space. The plies can include biodegradable materials, and the protective article as a whole can be made of at least 75% by weight of a biodegradable material. The expandable composite includes a biodegradable matrix, and a plurality of cellulose-based expandable microspheres configured to cause the biodegradable matrix to expand upon activation of the cellulose-based expandable microspheres. In some embodiments, the microspheres are entrained in the biodegradable matrix. The first and second walls are superimposed on each other to define a container cavity therebetween configured and dimensioned to contain therein the product to be shipped, with the expansion spaces of the walls are superimposed on each other about the container cavity. The first and second walls are connected to each other on a plurality of sides of the container cavity. The expandable composite in a pair of the expansion spaces is disposed and provided in sufficient amount for providing cushioning to a product contained in the container cavity.

According to various embodiments, the walls can be unsealed to each other at an open side of the container cavity, which open side is dimensioned to allow insertion of the product therethrough into the container cavity. The protective article can further include a closure on the first wall configured for sealing the first wall to the second wall to seal closed the open side to retain the product in the cavity.

According to various embodiments, the protective article further includes a web that includes the first and second walls connected to each other in a series of locations transversely across the web to define a plurality of connected protective packaging units configured to be separated from each other, each of the packaging units including a pair of the expansion spaces superimposed over each other about at least one container cavity.

According to various embodiments, the biodegradable matrix can include a biodegradable polymer, a biodegradable adhesive, or a combination thereof. The biodegradable polymer can include natural starch, synthetic starch, cellulose, biopolyesters, proteins, polysaccharides or a combination thereof. The biodegradable polymer is optionally cellulose.

According to various embodiments, the biodegradable adhesive includes a starch-based adhesive, a cellulose-based adhesive, a biopolyester-based adhesive, a protein-based adhesive, a polysaccharide-based adhesive, or a combination thereof. The biodegradable adhesive is optionally a cellulose-based or starch-based adhesive.

According to various embodiments, the cellulose-based expandable microspheres can include a blowing agent. In other embodiments, the microspheres can include a reactive component, a chemical catalyst, or a combination thereof. The cellulose-based expandable microspheres can include the blowing agent including air, carbon dioxide, nitrogen, methane, ethane, propane, isobutane, n-butane, neo-pentane, inert gas such as argon and helium, or a combination thereof. The cellulose-based expandable microspheres can include an outer shell and an inner core material, the outer shell including cellulose. The cellulose-based expandable microspheres can include a hydrocarbon, water or a combination thereof. The cellulose-based expandable microspheres are configured to be activated thermally. The activation can cause the cellulose-based expandable microspheres to expand, thereby expanding the biodegradable matrix. The biodegradable matrix can be configured to solidify after expanding.

According to various embodiments, a protective article is provided. The protective article includes a first ply defining an expansion area, and an expandable composite in the expansion area. The expandable composite includes a biodegradable matrix; and a plurality of cellulose-based expandable microspheres configured to cause the biodegradable matrix to expand upon activation of the cellulose-based expandable microspheres.

According to various embodiments, the first wall can include a second ply superimposed on and connected to the first ply, such that the first and second plies define therebetween a first expansion space enclosing the expansion area. The expandable composite is contained in the first expansion space. The protective article can further include a second wall. The second wall includes opposing substrate plies superimposed on, and connected to, each other to define a second expansion space therebetween; and an additional amount of the expandable composite contained in the second expansion space. The first and second walls are superimposed on each other to define a container cavity therebe-tween configured and dimensioned to contain therein the product to be shipped, with the expansion spaces of the walls are superimposed on each other about the container cavity. The first and second walls are connected to each other on a plurality of sides of the container cavity.

According to various embodiments, an expandable web is provided. The expandable web includes a first ply; a second ply; and an expandable composite in the expansion area. The expandable composite includes a biodegradable matrix; and a plurality of cellulose-based expandable microspheres configured to cause the biodegradable matrix to expand upon activation of the cellulose-based expandable microspheres. The first ply and the second ply each can be made of at least 75% by weight of a biodegradable material.

According to various embodiment, a method for making an expandable protective article is provided. The method includes a step of applying an expandable composite onto the surface of a first ply. The expandable composite includes a biodegradable matrix, and a plurality of cellulose-based expandable microspheres configured to cause the biodegradable matrix to expand upon activation of the cellulose-based expandable microspheres. The method further includes a step of applying a second ply over the first ply such that the expandable composite is sandwiched between the first ply and the ply.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
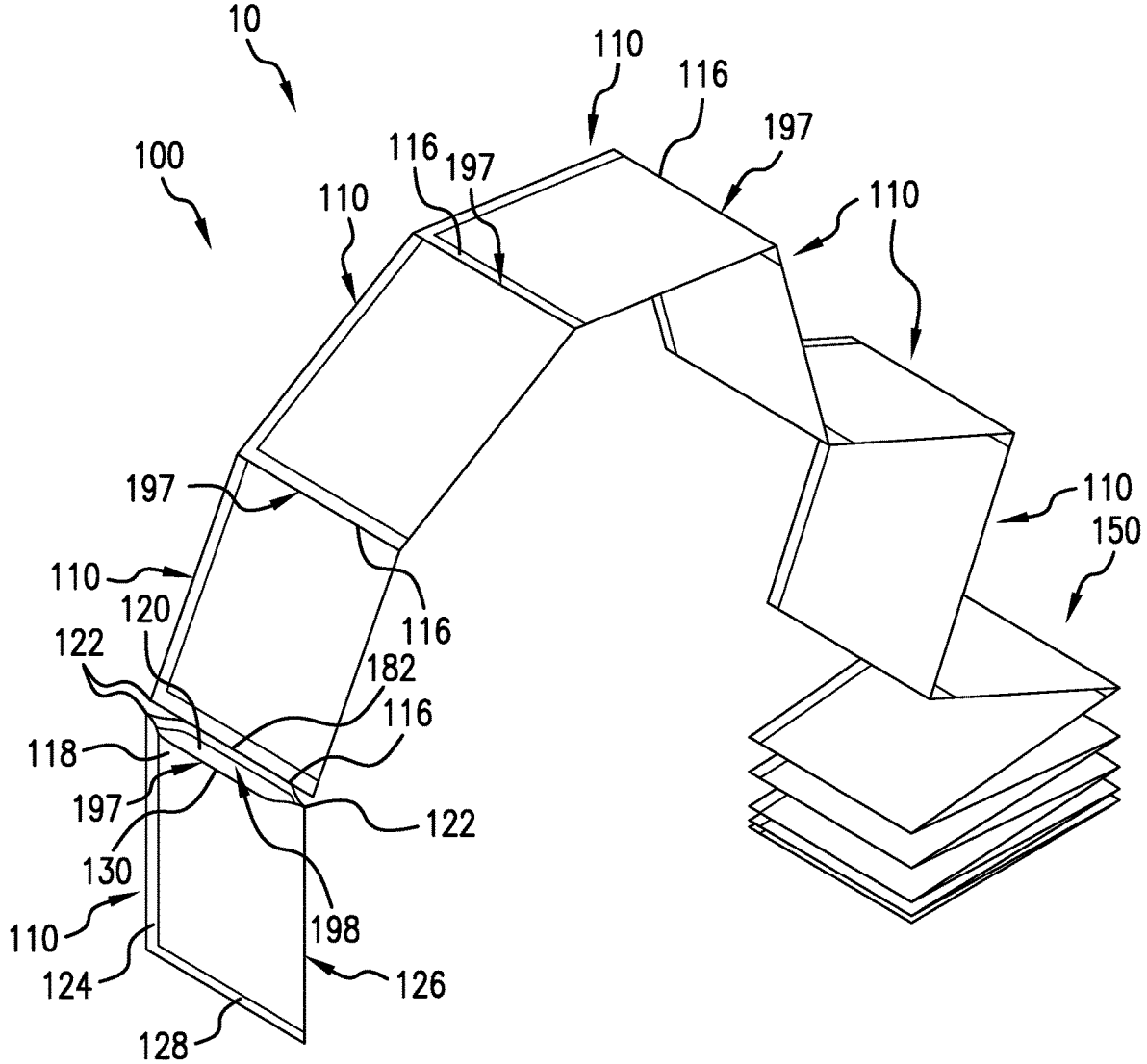
FIG. 1 a perspective view of a web of packaging units in a fan-fold configuration in accordance with one embodiment of the disclosure.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples can be utilized and other changes can be made without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are implicitly contemplated herein.

FIG. 1 shows an embodiment of a web 100 of a protective article as a series of connected, separable protective packaging units 110 in a supply configuration 150. The protective article can be selected to provide padding and/or insulation. For example, in one embodiment, the protective article is provided as a padding material to be inserted within a structure to provide structural stability to that structure, such that the structure can better withstand mechanical forces with the padding material. In another embodiment, the protective article is provided as an insulation material to be inserted within a structure to provide at least one of thermal and/or sound insulation to that structure, such that the insulation material can minimize the transfer of heat and/or sound through the structure.

The protective article can be divided into a plurality of protective packaging units. Each protective packaging unit can be provided as a singular unit of the padding material to provide padding and/or insulation, as described above. For example, in one embodiment, a protective packaging unit is a pad inserted within a structure to provide structural stability to that structure. In this embodiment, the pad is a padding wall that provides structural stability to the structure. In another embodiment, a protective packaging unit is a packaging container with protective packaging walls defining a container a cavity provided to receive an object (such as a product for shipment) therein. The packaging container can be a bag, mailer, box, or other packaging container provided to house an object, such as during transportation. In other embodiments, packaging containers is a food container with insulative walls defining a food container cavity provided to receive food, such that hot food or drink can be placed in the food container cavity without overly increasing the temperature of the outer surface of the food container and minimizing burn risks associated with hot containers.

The protective article can be provided as a web. A web is a generally flat configuration of material having a large surface area with a thin thickness relative to that surface area.

For example, packaging units 110 depicted in the embodiment shown in FIG. 1 are a web of packaging containers. Packaging units 110 are made of protective packaging wall portions 118, 120. Wall portions 118, 120 are two portions of a wide wall of web folded over, such that longitudinal side portion 124 and transverse side portion 128 of each wall portions 118, 120 seal together to define a container cavity 198 within. Side portions 124, 128 are sealed together with a sealing material applied on at least one of the interior surfaces of walls 118, 120 corresponding to those side portions 124, 128, as further described below. Walls 118, 120, side portions 124, 128, edge 126, and edge 130 defines a container cavity 198 therebetween. In particular, walls 118, 120 defines the top and bottom boundaries of container cavity 198 while side portions 124, 128, edge 126, and edge 130 defines the perimeter of container cavity 198. Container cavity 198 is in communication with opening 197 such that container cavity 198 can receive an object inserted through opening 197.

Figure 13:
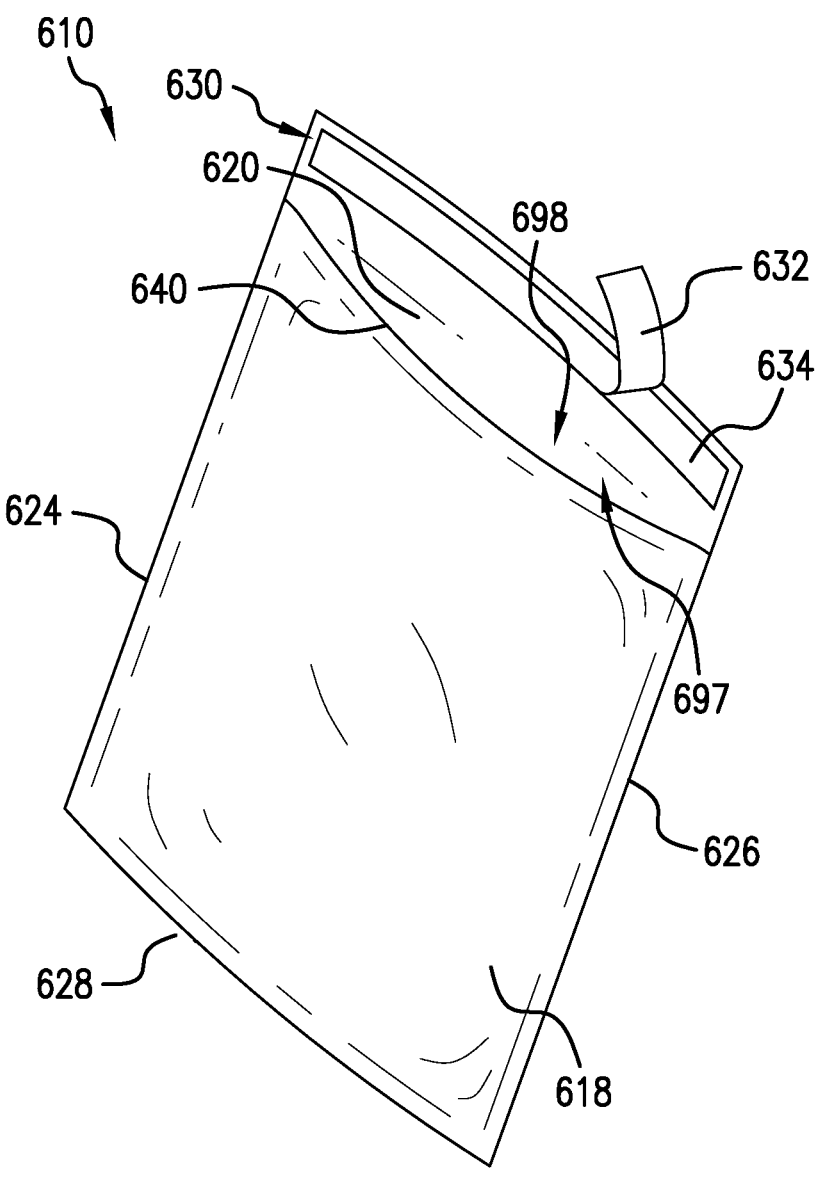
FIG. 13 is a perspective view of another embodiment of a protective packaging unit that has a closure flap.

Wall 118 is cut along edge 130 such that an opening 197 is defined between wall 118, 120, an edge 130 of wall 118, and longitudinal side portions 124, 126. Opening 197 is in communication with container cavity 198 and provided to allow for an object to be inserted within packaging unit 110. In this manner, the object can be longitudinally inserted into packaging unit 110 in a top-loading configuration. A top-loading configuration is where an object can be inserted in an opening facing an adjacent packaging unit. In other embodiments, the opening is cut along a portion of the packaging unit adjacent and parallel to the transverse side portions such that an object is transversely inserted within packaging unit in a side-loading configuration, where the opening is facing away from an adjacent packaging unit. In yet other embodiments, the opening is cut along the wall a distance from the edge or transverse side portions of the packaging units. In this embodiment, the other wall extends past the opening a distance to allow for the other wall to act as a flap that later closes over the wall the opening is cut in to contain the object (e.g., flap 630, as shown in FIG. 13). In yet further embodiments, the opening is a line of perforations, a scoring line, or other suitable structure.

Packaging units 110 are secured to adjacent packaging units 110 along regions of weakness 116. Regions of weakness 116 are a line of perforations or slits, a scoring line, or other suitable structure allowing for each packaging unit 110 to be separated from adjacent packaging units 110 along web 100.

Packaging units 110 are cut along edge 130 from transverse side portions 124, 126 to form lateral slits 122 along each side of regions of weakness 116. Such lateral slits 122 facilitate easier opening of opening 197 and easier separation of packaging units 110 from each other. In other embodiments, the packaging units have no lateral slits and, instead, have a region of weakness along the entire edge of the packaging unit.

The web can be manipulated to form a supply configuration, such that the web can be conveniently extracted from the supply configuration at a later time. For example, in one embodiment, a supply configuration is in the form of a roll configuration, where the web is rolled up and the web can be later pulled from the roll. In another embodiment, a supply configuration is in the form of a fanfold configuration, such as supply configuration 150 depicted in FIG. 1, where the web is folded in an accordion style to form a stack of web to be later pulled from the stack.

The protective article can include a wall that defines an expansion space to receive an expandable composite. In one embodiment, the expandable composite is provided to be expandable, such that the expandable composite can be activated to expand upon certain conditions (e.g., heat or pressure). In this embodiment, the protective article is an expandable protective article having an expandable form that can be expanded after the expandable composite is activated. In another embodiment, the expandable composite is expanded, such that the expandable composite has already been activated from an expandable composite and has expanded within the wall. In this embodiment, the protective article is an expanded protective article having an expanded form after the expandable composite has already activated. In this embodiment, the expanded wall is used as a part of a packaging container or as a padding wall for a pad. In yet other embodiments, protective articles have no expandable composite such that the protective article is not expandable.

For example, protective article 10 of the embodiment shown in FIG. 1 is an expandable protective article that has an expandable composite that is not yet expanded. In this embodiment, walls 118, 120 can include an expandable composite that can later be expanded such that walls 118, 120 form expanded walls. Where packaging unit 110 is a container, such expanded walls can act as a padded wall for a container to assist in protecting the object housed within the container from impact. In other embodiments, only one of walls 118, 120 are expandable, such that, when the expandable composite is later expanded, only one of walls 118, 120 are expanded. The expandable composites are discussed in further detail below.

In one embodiment, the supply configuration can be a high-density configuration, where the expandable composite in the wall of the web of the protective article is expandable but is not provided in an expanded configuration, thus allowing for a denser configuration of the web within the supply configuration. In this embodiment, the expandable web of the protective article is a web of expandable, connected, and separable protective article units. In this manner, a user can receive the high-density configuration and expand the web of the supply configuration at a later time. In an alternative embodiment, the supply configuration is a low-density configuration, where the expandable composite in the wall of the web of the protective article is expanded, thus resulting in a less dense configuration of the web within the supply configuration. In this embodiment, the expanded web of the protective article is a web of expanded, connected, and separable protective article units. In this manner, a user can receive the low-density configuration without having to later expand the web of the supply configuration.

For example, supply configuration 150 depicted in the embodiment shown in FIG. 1 is a high-density fanfold configuration where the protective article is expandable but not yet expanded. Packaging units 110 are folded along regions of weakness 116 so that packaging units 110 are stacked on top of each other in an expandable supply configuration 150.

Figure 2:
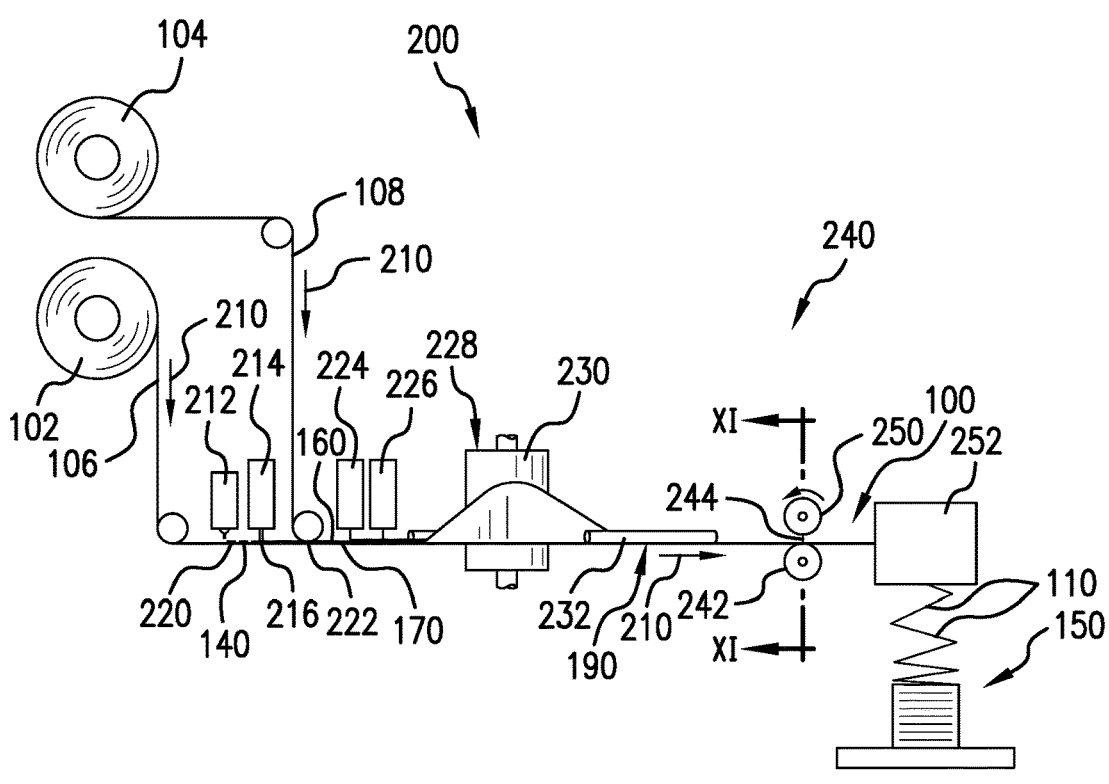
FIGS. 2 and 3 are a top and side schematic views of an embodiment of a system for converting stock material into the separable protective-packaging units of FIG. 1.
Figure 3:
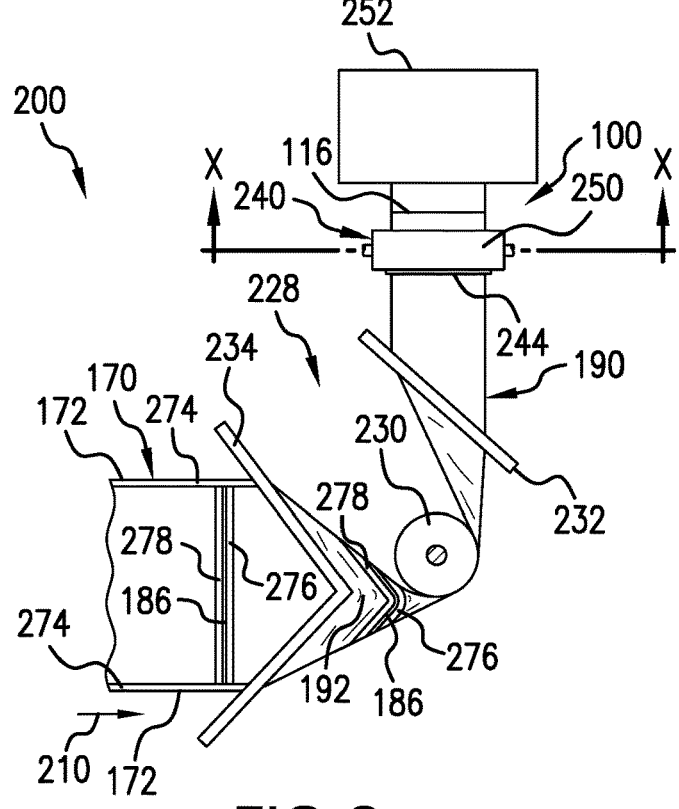

Referring to the embodiment shown in FIGS. 2 and 3, system 200 is configured to process stock material into a web of the protective article, which, in this embodiment, is provided as a supply configuration 150 of a series of connected, separable protective article units 110. The system 200 pulls substrates from substrate supplies, which in this embodiment are substrate rolls 102, 104 of the respective substrates 106, 108 provided as webs. Each substrate 106, 108 is pulled from the supply as a web in a downstream direction 210. In other embodiments, other supply configurations can be used, and the separate webs can be combined into fewer webs and folded over each other to provide the plies described below. Other embodiments instead use additional webs to provide the plies described below.

The substrates in this embodiment are made of paper. These paper substrates are permeable to air or water to allow for the vapors expelled from the expandable composite as the expandable composite is being expanded to vent through the paper substrate. In other embodiments, the substrates have vents defined along a surface of at least one of the substrates to vent the vapors from the expandable composite. The paper substrate can be cardboard, kraft paper, fiberboard, pulp-based paper, recyclable material (e.g., recyclable paper or plastic), paper, newsprint. In other embodiments, the paper substrate includes a coating along the substrate so that the paper substrate is impermeable to air or water but allowing for the paper substrates to be heat sealable. For example, the coating can be wax, plastic, water-resistant materials, and/or stain-resistant materials. In such embodiments, the paper substrate may have a thickness between 20 and 90 microns, preferably about 30 microns. Additionally, the paper substrate can be 20-90 lbs/ream (or 20-90 lbs/per 500 sheets of substrate). In other embodiments, the substrates can be made of polymers (e.g., polyolefins, polyethylene, polypropylene, polyesters, or other suitable polymers), foil, poly or synthetic material, and/or other suitable materials of suitable thicknesses, weight, and dimensions. The substrates can also be made of biodegradable materials (e.g., paper, natural starch, synthetic starch, cellulose, biopolyesters, proteins, polysaccharides, or other suitable biodegradable materials). As used herein, the term "biodegradable" means that a substance decomposes from exposure to light, air, water, or any combination thereof or from the action of naturally occurring microorganisms such as bacteria, fungi and algae. In some embodiments, the paper substrate is primarily made of biodegradable materials. For example, in such embodiments, the paper substrate is made of at least 75%, 85%, or 95% by weight, or substantially entirely of biodegradable materials. In some embodiments, the stock material used to convert the substrate into packaging units are primarily made of biodegradable materials. In a further embodiment, the protective article, as a whole, is primarily made of biodegradable materials. For example, in such embodiments, the protective article is made of at least 75%, 85%, or 95% by weight, or substantially entirely of biodegradable materials. Preferably, the protective article is recyclable. For example, in such embodiments, the protective article is recyclable at least 80%, 85%, 90%, 95% by weight, or substantially entirely of the protective article.

System 200 handles web of substrates 106, 108 to provide the web of substrates 106, 108 as a ply 140. An expandable composite applicator 212 applies expandable composite 220 to substrate 140 as substrate 140 is pulled downstream. Expandable composite 220 can be configured to expand with the application of certain expansion conditions, such as, e.g., heat, pressure or chemical reaction, or other suitable means.

Figure 6:
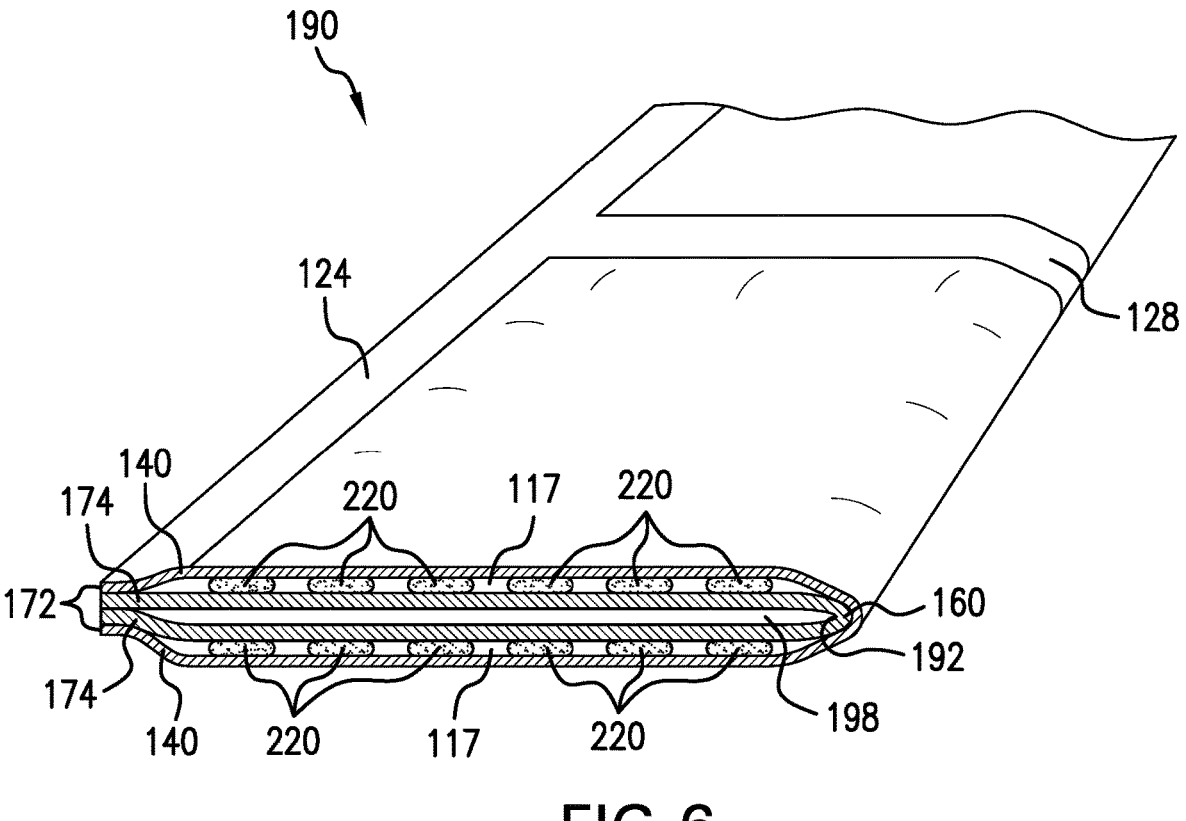
FIG. 6 is a perspective, cross-sectional view of a web of protective packaging units formed by the system of FIGS. 2 and 3 after folding the web of FIG. 5 over itself.
Figure 7:
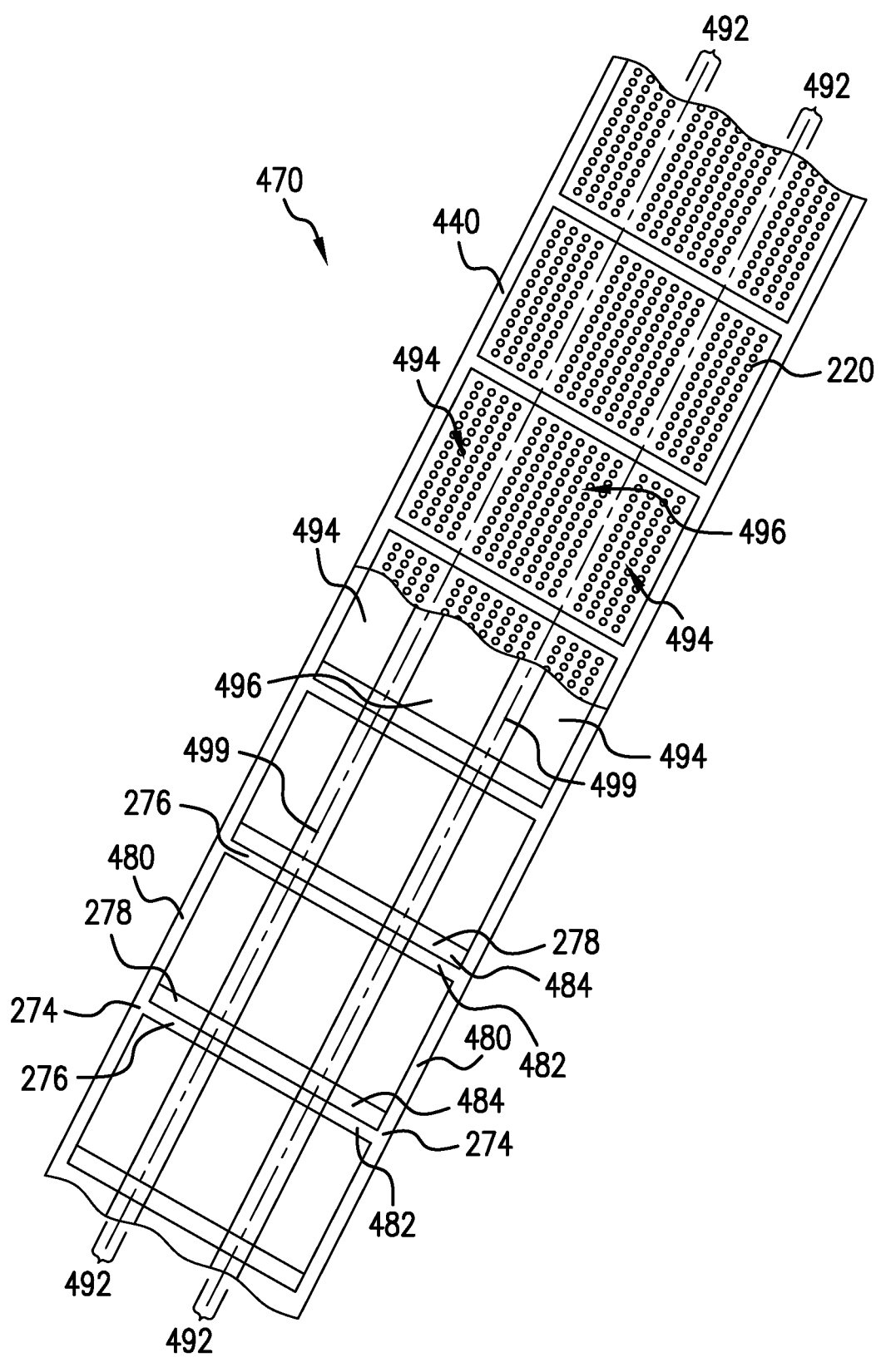
FIG. 7 is a top, cutaway view of an embodiment of web used to produce protective article.

Expandable composite 220 is typically applied in a pattern that can include regular shapes (e.g., circles, ovals, squares, rectangles, triangles, polygonal, lines etc.), irregular shapes (e.g., random or stochastic shapes), or as otherwise desired for providing the expandable composite along the substrate. For example, expandable composite 220 can be applied in a pattern that allows for expandable composite to form a continuous layer upon pressure being applied at a later step. In one embodiment, the expandable composite is applied covering most or all of an expansion area along the ply and to, later, define an expansion space between substrates (such as expansion space 117, as shown in FIG. 6). For example, the expandable composite is applied over the entire surface of the ply. In other embodiments, expandable composite 220 is applied to the ply as a continuous layer along most or all of the ply. In yet another embodiment, expandable composite 220 is applied over a portion of the ply, such that the expandable composite is applied along the ply at a distance from the edge of the ply. In some suitable embodiments, expandable composite 220 is applied so that some regions of the expansion area along the ply have less, or are free of, the expandable composite 220 to facilitate easier folding along natural hinge areas at a later step in the process. For example, a linear portion of the ply includes less expandable composite 220 relative to other portions of the ply or expandable composite 220 can be absent along that portion, thus forming a natural region that allows for easier folding in a later step when expandable composite 220 is expanded (e.g., area 492, as shown in FIG. 7). Alternatively or additionally, pressure is applied along certain linear areas after the application of expandable composite 220, and before or after expansion of expandable composite 220 to form a hinge along those areas. In a yet further alternative, expandable composite 220 is applied with uniform or varying thicknesses or widths.

Expandable composite 220 can include a matrix. The matrix can be a fluid matrix, such as a gel or liquid, allowing for ready application onto first ply 140. Alternatively or additionally, the matrix can be a solid matrix that may go through a gel or fluid phase. The matrix can be a mixed matrix including both a gel or liquid, and solid such that solid particulates are entrained within the gel or fluid.

The matrix can be made of polymers including emulsion-based polymers. The polymer can be thermoplastic. The polymers can be at least one of vinyl acetate ethylene, polyvinyl acetate, polyvinyl alcohol, polyvinyl acetate copolymers, polyvinyl alcohol copolymers, dextrin stabilized polyvinyl acetate, vinyl acetate copolymers, ethylene copolymers, vinylacrylic, styrene acrylic, acrylic, styrene butyl rubber, polyurethane, polyolefins, biodegradable materials (e.g., cellulose and starch), and/or other suitable expandable composites.

In some embodiments, the matrix includes polyurethane, and the matrix contains more than 50%, 75%, 90% or 95% of polyurethane, based on the total weight of the matrix.

The matrix can alternatively include a polyolefin dispersion. Preferably, the matrix contains more than 50%, 75%, 90% or 95% of polyolefin, based on the total weight of the matrix. The polyolefin dispersion can be polyethylene and/or polypropylene, ethylene-based thermoplastic polymers, propylene-based thermoplastic polymer, polyethylene film or foam, polymeric stabilizing agents including at least one polar polymer, water, and/or other suitable polyolefin dispersions. The ethylene-based thermoplastic polymer may include high-density polyethylene (HDPE), linear low-density polyethylene (LLDPE), low-density polyethylene (LDPE) or a combination thereof. The term, "ethylene-based polymer," as used herein, refers to a polymer that comprises a majority amount of polymerized ethylene monomer (based on the total weight of the polymer), and optionally may comprise at least one polymerized comonomer. In some embodiments, ethylene-based polymer contains more than 50%, 75%, 90% or 95% of ethylene moieties, based on the total weight of the polymer. The propylene-based thermoplastic polymer is optionally oriented polypropylene (OPP). The term "propylene-based polymer," as used herein, refers to a polymer that comprises, in polymerized form, a majority amount of propylene monomer (based on the total weight of the polymer) and optionally may comprise at least one polymerized comonomer. In some embodiments, propylene-based polymer contains more than 50%, 75%, 90% or 95% of propylene moieties, based on the total weight of the polymer. A suitable polyolefin dispersion can be, for example HYPOD™, from Dow Chemical, or other suitable polyolefin dispersions.

The matrix can alternatively include a polyolefin based adhesive. Adhesives are materials that can stick to an opposing surface without relying on the opposing surface having a same or complimentary material to form a seal between surfaces. Adhesives can be liquid adhesives, which typically require water to form a seal between surfaces. Alternatively, adhesives can be dry adhesives, which typically do not require activation with water, solvent or heat to form a seal between surfaces. Additionally, adhesives can be pressure sensitive adhesives, which can seal surfaces together after applying a slight, initial, external pressure. Examples of these include water-based, acrylic, pressure sensitive adhesives, similar to what is applied to packaging tape, which material holds two surfaces together solely by surface contact, often upon a slight initial external pressure. Examples may include dry adhesives, which typically require no activation with water, solvent or heat, and firmly adhere to many dissimilar surfaces. Pressure sensitive adhesives can be selected that are aggressive and/or permanently tacky at room temperature. Pressure sensitive adhesive application and use can be automated. When used in assembly, pressure sensitive adhesives that do not require setup or long curing times can be used to save time compared to using typical liquid adhesives. Adhesion is preferably immediate with pressure sensitive adhesives, allowing manufacturing procedures to continue uninterrupted, which can result in significant time and labor savings. Examples of water based, acrylic, pressure sensitive adhesives include those known as RHOPLEX N-1031 Emulsion, RHOPLEX N-580 Emulsion, RHOPLEX N-619 Emulsion, or other suitable types pressure sensitive adhesives. Other emulsion polymers or acrylic polymer blend adhesives are also known, and other suitable types of adhesives and/or contact adhesives can be used.

Alternatively, the matrix can be a water-based adhesive. The water-based adhesive may include a water-based polymer. In a yet further alternative, the matrix can be based on starch in its natural or synthetic forms. The starch can be in the form of a ground up micro-starch powder. The diameter of the ground up starch particles can be between about 12 microns to about 20 microns. The starch-based matrix can include at least one of water or other solvent, a surfactant, polar bonding agent, or other fillers. For example, the starch-based matrix can comprise up to 50% water. In some embodiments, the matrix comprises 25%-80% or 30-40% starch. Such a starch-based matrix can be biodegradable. In other suitable embodiments, the biodegradable matrix comprises a starch-based adhesive.

In a further alternative embodiment, expandable composite can be made of multiple materials separated by a barrier that, when mixed or in contact with each other, causes the expandable composite to expand into an expanded configuration. For example, the barrier can be a microsphere shell, such as those disclosed in U.S. Provisional Application No. 62/706,110. Such microspheres can be expandable and/or rupturable, for example upon the application of sufficient heat. The microspheres can have an outer shell and an inner core. Suitable outer shells can be made of, for example, a thermoplastic polymer including but not limited to polyacrylonitrile or PVC, as well as glass, rubber, starch, cellulose, ceramic, or other suitable materials. In other suitable embodiments, the plurality of heat-expandable microspheres include a solid, liquid or gas core made from a hydrocarbon, water, or other suitable chemical that can be activated to expand or rupture the microsphere shell. In other suitable embodiments, the microspheres can be made of biodegradable materials such as, for example, cellulose. The cellulose-based microspheres have a shell that can be made of cellulose. The term, "cellulose-based microsphere," as used herein, refers to a microsphere that comprises a majority amount of cellulose based on the total weight of the microsphere. In some embodiments, cellulose-based microsphere contains more than 50%, 75%, 90% or 95% of cellulose based on the total weight of the microsphere. In some embodiments, the expandable composite itself is a cellulose-based expandable composite. The term, "cellulose-based expandable composite," as used herein, refers to an expandable composite that comprises a majority amount of cellulose based on the total weight of the expandable composite. The cellulose-based expandable composite preferably contains more than 50%, 75%, 90% or 95% of cellulose based on the total weight of the expandable composite.

The microspheres can be mixed with the matrix prior to application on the web, or provided on the matrix after the matrix has been applied to the web, by mixing or forcing the microspheres into the matrix after application to the web, for example when the plies are pressed together.

The microspheres have an expansion temperature ($T_{exp}$), at which the microspheres begin to expand, and a maximum temperature ($T_{max}$), whereby, if the microspheres are heated above $T_{max}$, they will rupture. The $T_{exp}$ of the microspheres is not particularly limited, but is generally between about 60° C. and up to about 250° C. The $T_{max}$ of the microspheres is generally between about 80° C. and up to about 300° C. In other suitable embodiments, the $T_{max}$ is higher than 300° C. The microspheres are selected based on their maximum expansion temperature, depending on whether the microspheres are required to rupture or not. The $T_{max}$ is dependent on several properties, including the physical properties of the microspheres, the physical properties of the matrix, as well as the physical properties of the plies on which the matrix and microspheres are deposited. The heat can be generated via suitable means such as, for example, radiofrequency radiation or other suitable means, as described further below in reference to the expansion device. In other suitable embodiments, the radiofrequency radiation is applied to the expandable composite 220 at frequencies of approximately 10-45 MHz or as appropriate for the microsphere composition and the material of the matrix. In other embodiments, other frequencies may be used. The heating parameters selected are dependent upon the expandable composite or materials 220 used. In such technology, the expandable composite can be dispensed into a receptacle, such as a bag, where expandable composite is activated, and expands to fill the void of bag. If there is a product present in the receptacle, the expandable composite will expand when activated, and form itself around the product.

System 200 can include an expansion device to cause expandable composite 220 to expand. In the embodiment where the expandable composite includes the emulsion polyolefin dispersion, the microspheres cause the emulsion polyolefin dispersion to expand upon activation of the expandable microspheres. In some embodiments, the microspheres are entrained in the emulsion polyolefin dispersion. The expansion device can include a heating element, heating coil, hot air applicator, radiofrequency radiation generator, ultra-violet light applicator, chemical reaction applicator, pressure mechanism, or other suitable device for expanding expandable composite 220. The expandable composite can include blowing agents. In such embodiments, the expandable microspheres including blowing agents, once activated, expand by itself and cause the emulsion polyolefin dispersion to expand. In other embodiments, the expandable composite can include reactive components, chemical catalysts and heating agents (which can apply heat to the expandable composite and/or cause the expandable composite to increase in temperature) and/or other suitable expansion devices. In this manner, the expansion device can activate expandable composite 220 to expand through at least one of a thermal process, mechanical process, chemical process, or other suitable means of activation expandable composite 220 to expand. For example, the expansion device can provide at least one of heat, pressure, or a chemical reaction.

Examples of blowing agents include air, carbon dioxide, nitrogen, argon, helium, methane, ethane, propane, isobutane, n-butane, neo-pentane, and the like. In some embodiments, blowing agents can be inert gas or any suitable material in general. The expandable composite can include blowing agents. In other embodiments, the expandable composite can include reactive components, chemical catalysts and heating agents (which can apply heat to the expandable composite and/or cause the expandable composite to increase in temperature) and/or other suitable expansion devices. In some embodiments, the gas or mixture of gases are added to the expandable composite by mechanical means. Examples of mechanical means include whisking or frothing the expandable composite to beat the air or other gases into the expandable composite and increase its volume. In other embodiments, the gas or mixture of gases can also be encapsulated in microspheres. When the microspheres are activated, they expand. The expansion of the microspheres causes expansion of the expandable composite.

Chemical reactions can include the mixing of two reactive components, that react to generate a foam. In some embodiments a catalyst is used to increase the rate of the chemical reaction. In some embodiments, the two reactive components are separated by a barrier prior to mixing and expansion. The barrier separating the reactive components can be the shell of a microsphere, wherein the core of the microspheres comprises one or more reactive components, and rupturing of the microsphere releases its contents into one or more other reactive components, causing a foam generating reaction. Other barriers may also be used such as walls, capsules, or other barrier forming containers. Examples of reactive components that cause expansion include mixing a liquid form of isocyanate with a multi-component liquid blend called polyurethane resin. When combined, these components release carbon dioxide and water vapor to generate a polyurethane foam. Other reactive components can be used that form a foam upon mixing.

Sealing material applicator 214 applies sealing materials 216 to an exposed surface of ply 140 and/or ply 160. Sealing material applicator 214 can apply sealing materials 216 using tape, such as a double-sided tape, or other suitable methods of applying sealing materials. In some embodiments, the sealing material includes polyethylene.

Sealing material 216 is configured to provide a strong enough seal such that, when plies 140, 160 are joined together, the sealed portions of plies 140, 160 can withstand the expansion of expandable composite 220 without the expanded materials escaping along those sealed portions. Sealing material 216 can be in the configuration of a strip-seal, coating, or other suitable configurations for sealing plies 140, 160 together. Sealing material 216 can be applied as a continuous layer or as a pattern of discontinuous strip-seals.

Sealing materials can be selected to be activated upon certain conditions to form a seal, such as upon application of heat or pressure. Sealing materials can be made of a cold glue. Sealing materials can be made of a bonding element that provides a sealing surface. The bonding element can be an adhesive, as described above, that provides an adhesive surface. The bonding element can alternatively be a cohesive that provides a cohesive surface. Cohesives can seal one surface to an opposing surface by having one cohesive on a first surface coming into contact with the same or complimentary cohesive along an opposing surface. While cohesives generally do not stick to other substances sufficiently to adhere to those other substances or, other suitable cases, would stick very weakly compared to the bond they form from sticking to each other, certain cohesives (e.g., latex cohesives) can be mixed with water to bond to non-cohesive surfaces such that, the cohesive can remain stuck to the non-cohesive surface upon drying.

Figure 4:
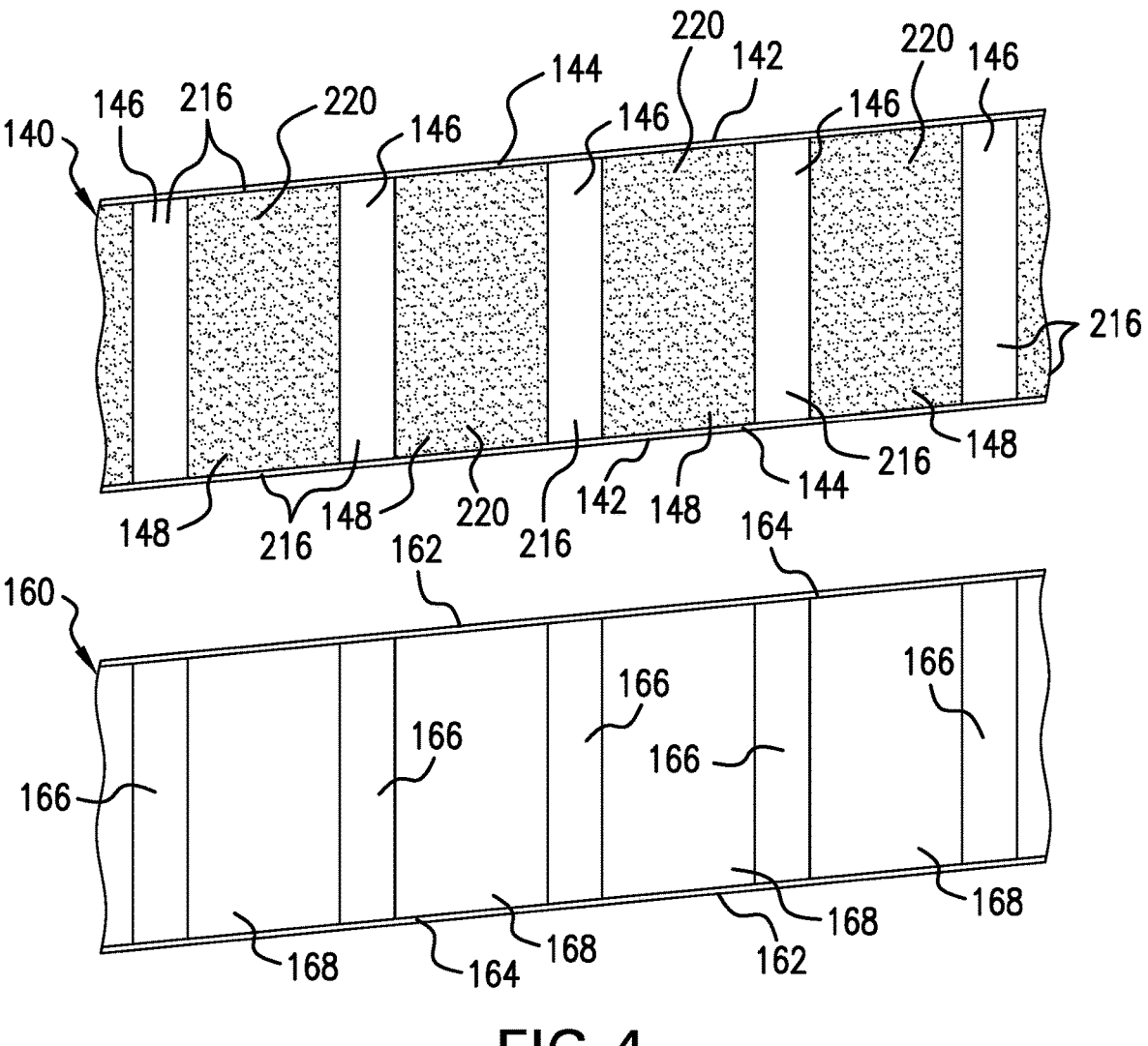
FIGS. 4 and 5 are a top, perspective view, respectively, of a ply of webs used in the system of FIGS. 2 and 3 for making protective article.

Referring to FIG. 4, ply 140 includes sealing material 216 applied along longitudinal areas 144 along longitudinal edges 142 transverse areas 146. In other embodiments, sealing material 216 can be applied along longitudinal areas 144 adjacent to, but distanced from, longitudinal edges 142. In the embodiment shown in FIG. 4, sealing material 216 is applied along transverse areas 146 longitudinally spaced apart from each other and between longitudinal areas 144. In other embodiments, sealing material 216 is applied along ply 140 parallel to longitudinal area 144. In further embodiments, sealing material 216 is applied only along longitudinal areas 144. In this embodiment, ply 160 is free of sealing material. Ply 160 defines areas that are configured to correspond to portions of ply 140 that include sealing material 216, such that, when plies 140, 160 are later joined together, areas 144, 146 of ply 140 with sealing material 216 join with corresponding areas of ply 160 free of sealing material. In particular, ply 160 defines longitudinal areas 164 and edges 162 that are configured to correspond to longitudinal area 144 and edges 142, and transverse areas 166 that are configured to correspond to transverse areas 146 when plies 140, 160 join together. In preferred embodiments, the plies 140, 160 are biodegradable materials, and the protective article as a whole are biodegradable. The biodegradable protective article includes, for example, biodegradable plies, a biodegradable composite including a biodegradable matrix and a plurality cellulose-based expandable microspheres. The biodegradable plies can include plastic substrates such as polyolefin, for example, polyethylene film or foam.

In other embodiments, second ply 160 also includes sealing materials along areas 164, 166 to provide a stronger seal between plies 140, 160. In this embodiment, a longitudinal sealing material is applied along longitudinal areas 164, and a transverse sealing material is applied along transverse area 166, such that, when plies 140, 160 join together, the sealing materials along areas 164, 166 corresponds with the sealing material along areas 144, 146. For example, the one or more longitudinal seals and the one or more transverse seals can include a pressure-activated adhesive, a cold glue (e.g., a collagen-based glue, a polyvinyl acetate-based glue, or other suitable glues), and/or other suitable sealing materials.

Expandable composite 220 is applied along expansion areas 148 on ply 140. Expansion areas 148 are bounded by longitudinal areas 144 and transverse areas 146 to define the perimeter around expansion areas 148. Ply 160 defines expansion areas 168 configured to correspond to expansion areas 148 when plies 140, 160 join together. Expansion areas 168 are bounded by longitudinal areas 164 and transverse areas 166 to define the perimeter around expansion areas 168. When plies 140, 160 are later joined together, expansion areas 148, 168 can define an expansion space therebetween (e.g., expansion space 117, as shown in FIG. 6) to house expandable composite 220 therebetween.

In other embodiments, the ply only includes sealing materials along one of the areas, such that expansion areas are only bound along one of a longitudinal or transverse perimeter for expandable composite 220 to expand within. In another embodiment, there is no sealing material along the ply, such that expandable composite 220 is not bound by sealing material. In other embodiments, expandable composite is applied on only a portion of the expansion area.

In other embodiments, there is no sealing material applicator as the plies can be configured to bond to each other without sealing material. For example, in one embodiment, expandable composite 220 is used as an adhesive that can join the plies together. In this embodiment, expandable composite 220 are applied along the plies, such that a pressure can be applied to the plies to evenly spread expandable composite 220 between the plies. For example, expandable composite 220 are pressed between the plies to spread adjacent the edges of the plies. In another embodiment, the plies include a coating along the plies that can heat-seal the plies together. In another embodiment, the rolls include an adhesive that can activated when heated.

Referring again to FIGS. 3-4, system 200 includes pressure applicator 222, illustrated here as a roller, but other suitable mechanisms can be used. After expandable composite 220 and sealing material 216 are applied, pressure applicator 222 applies a pressure to plies 140, 160 at the areas of plies 140, 160 that sealing materials 216 was applied between (e.g., along areas 144, 146, 164, 166) to join plies 140,160 together so that the web of plies 140, 160 cumulatively forms a protective packaging wall 170. The joined plies 140, 160 define an expansion space therebetween to house expandable composite 220 (such as expansion space 117, as shown in FIG. 6). In some embodiments, pressing the plies together can spread out expandable composite 220 to form a continuous layer.

System 200 includes seal applicators 224, 226 each applying different sealing materials. For example, seal applicator 224 can apply sealing materials 274, 276 and seal applicator can apply a different sealing material 278 to an exterior surface of wall 170. In other embodiments, seal applicators apply any combination of the sealing materials. In further embodiments, each of seal applicators apply a same sealing material. In a yet further embodiment, there may only be one seal applicator. Seal applicators 224, 226 are similar to seal applicator 214, and sealing materials 274, 276, 278 can be similar sealing materials to those noted for sealing materials 216, or other suitable sealing materials can be used.

Figure 5:
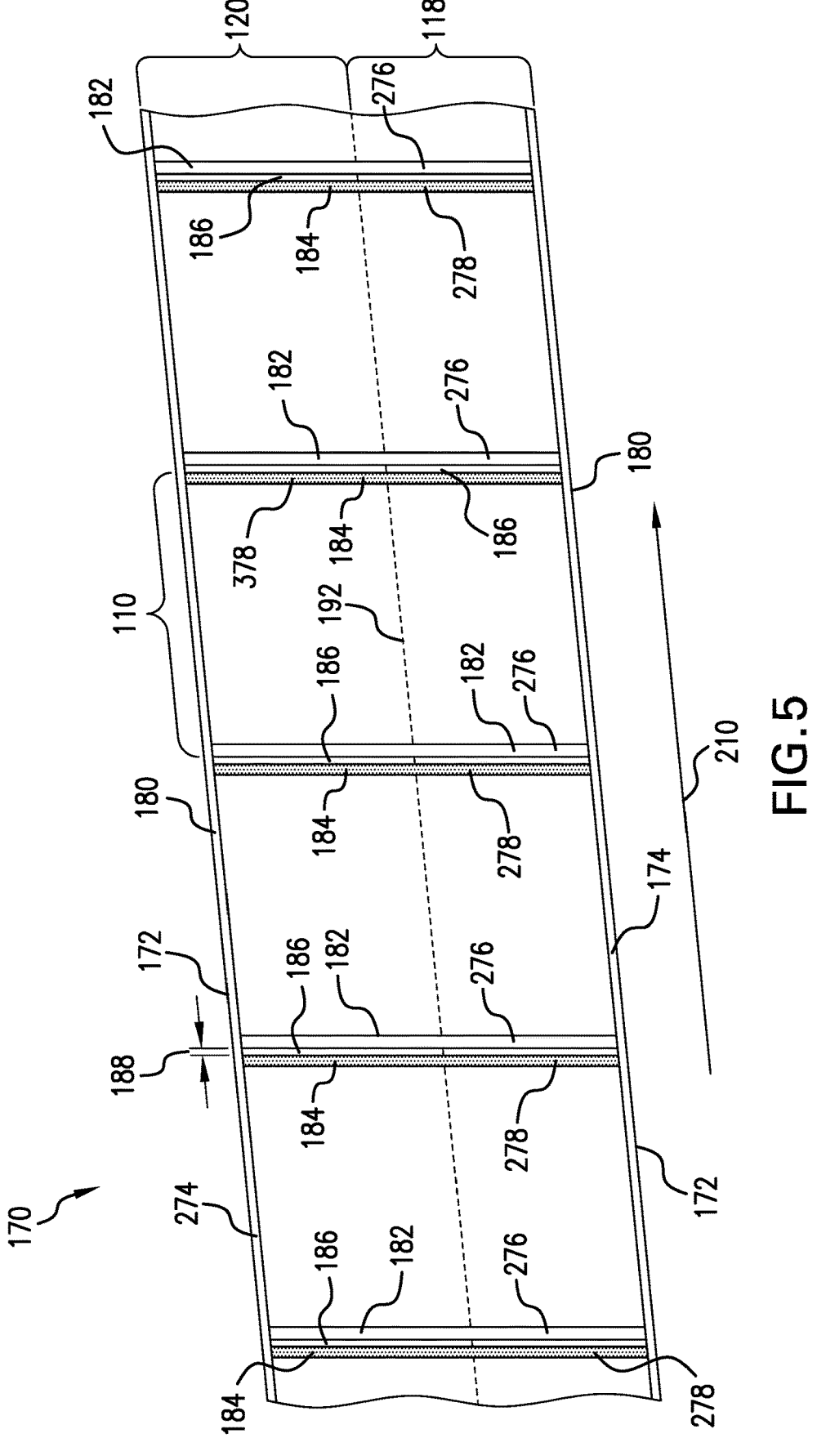

FIG. 5 depicts the embodiment of wall 170 after seal applicators 224, 226 have applied sealing materials 274, 276, 278 to an exterior surface of wall 170. Sealing material 274 can be applied along longitudinal areas 180. In this embodiment, sealing material 274 is applied along longitudinal area 180 adjacent longitudinal edge 172, however, in other embodiments, sealing material 274 is applied along the longitudinal area a distance from the longitudinal edge. Sealing materials 276, 278 are applied along transverse areas 182, 184, respectively, longitudinally spaced apart from each other and between longitudinal areas 180. However, in other embodiments, either of sealing materials 276, 278 are applied parallel to sealing material. In further embodiments, a sealing material is applied only along the longitudinal area of the wall. Sealing materials 276, 278 are separated by a gap 186 having a distance 188. Gap 186 can be configured to provide a space where an opening or region of weakness can be cut into.

Where sealing materials 274, 276, 278 are different conditional sealing materials having different conditions (e.g., temperature or pressure), certain of the sealing materials are selected to be activated at one condition different from the other sealing materials that are selected to be activated at other conditions. For example, in one embodiment, sealing materials 274, 276 can be selected to be activated to form a seal at a temperature or pressure different from a temperature or pressure required to activate seal 278. In this manner, sealing materials 274, 276 can form a seal along areas 180, 182 without sealing material 278 forming a seal along areas 184. However, in other embodiments, the sealing materials are selected to have similar conditions for creation of a seal. In other embodiments, the sealing materials can be selected to have other combinations of conditions of each sealing material.

Sealing materials 274, 276, 278 can be applied along folded wall 190 with the same or varying widths or lengths to control a size and shape of a container cavity formed from folding web 170 at a later step. For example, the longitudinal sealing materials can be applied to have a thicker width adjacent the transverse sealing materials while smoothly transitioning to a thinner width therebetween. In such a configuration, the expansion space can be defined as having a curved side adjacent the longitudinal sealing materials.

As shown in FIGS. 2-3, system 200 includes a folding apparatus 228 that, after sealing materials 174, 276, 278 are applied to the exterior surface of wall 170, folds the wall 170 over itself to form folded wall 190 that includes superimposed protective walls enclosing a container cavity therebetween (e.g., container cavity 398, as shown in FIG. 6). In this embodiment, folding apparatus 228 folds wall 170 about folding mechanism 234 and applies tension to wall 170 with a tension mechanism 230 wall 170 during the folding process. For example, in one embodiment, folding mechanism 234 is a folding bar and tension mechanism 230 is a wheel. In this embodiment, the wheel pulls wall 170 into tension about the folding bar to fold wall 170 such that longitudinal areas 174 correspond with each other. Folding mechanism 234 can have a suitable shape for folding wall 170, such as a V-shape. Folding apparatus 228 additionally includes a flattening mechanism 190 configured to flatten folded wall 190. Flattening mechanism 190 can be a flattening bar configured to apply pressure to, and flatten, folded wall 190. Other suitable folding mechanisms known in the art can be used.

A sealing apparatus then seals wall 170 such that sealing materials 174, 276 form seals along areas 180, 182. The sealing apparatus is configured to apply conditions to activate sealing materials 174, 276 (e.g., heat, pressure, and/or other suitable means of activating sealing materials 174, 276). In other suitable embodiments, flattening mechanism 190 functions as the sealing apparatus. In other embodiments, system 200 incorporates a separate sealing apparatus along a different part of the process.

With reference to FIG. 5, wall 170 defines an area 192 along which wall 170 is folded by folding apparatus 228. Wall 170 includes wall portions 118, 120 such that, when wall 170 is folded, wall portion 118 meets wall portion 120. In particular, sealing areas 180, 182, 184 of wall portion 118 meets with sealing areas 180, 182, 184 of wall portion 120.

Referring to the embodiment shown in FIG. 6, folded wall 190 is normally substantially flat, however folded wall 190 is depicted as having a substantially open container cavity 398 for illustrative purposes. As described further below, this meeting of sealing areas 180, 182, 184 allows for sealing materials 174, 276 to be sealed together at a later stage to form the boundaries of a protective packaging unit while sealing area 184 of wall portions 118, 120 are unsealed at this point in the process. Such an unsealed area can later be used as an opening for a packaging unit (e.g., packaging unit 110) to receive an object before sealing areas 184 with sealing material 278 acts as a closure for closing off the packaging unit after sealing material 278 forms a seal along sealing area 184. For example, sealing area 184 can be a part of a flap without another ply on top of sealing material 278. In this example, sealing material 278 is an adhesive activated by water, such that a user can lick the flap to activate the adhesive. In a yet further embodiment, sealing area 184 is free of sealing material such that a user later applies an adhesive along sealing area 184. Although the embodiment shown in FIG. 6 depicts longitudinal edges 172 of each wall portion 118, 120 meeting, in other embodiments, the longitudinal edges of each wall portion do not meet and one edge of one wall portion extends past the edge of the other wall portion.

Referring to FIG. 6 folded wall 190 defines a container cavity 398 between wall portions 118, 120 that can store one or more objects after wall 170 is folded along area 192. Container cavity 398 is further bounded on one side by seals formed from areas 180 of wall portions 118, 120 meeting each other and on another side by ply 160 folded about area 192. As will described further below, container cavity 398 will be further bounded by other sealed areas as protective packaging units 110 are defined along web 100. Expandable composite 220 can be expanded at a later stage to expand folded wall 170 (either as individual packaging units 110 or prior to forming such packaging units 110) such that wall portions 118, 120 are expanded to provide protection of objects housed within cavity 398 from impact (e.g., during shipment of the object).

In other embodiments, the system does not include a folding apparatus, such that the unfolded wall can be fed to a later stage in the process without being folded. For example, in such an embodiment, another wall is laid on top of the initial wall so that the sealing areas of each wall can correspond to each other and define an container cavity therebetween. An example of such a configuration can be seen in FIG. 11, where web 300 of the protective article 30 comprises two walls 318, 320 laid on top of another and defining container cavity 398.

Figure 8:
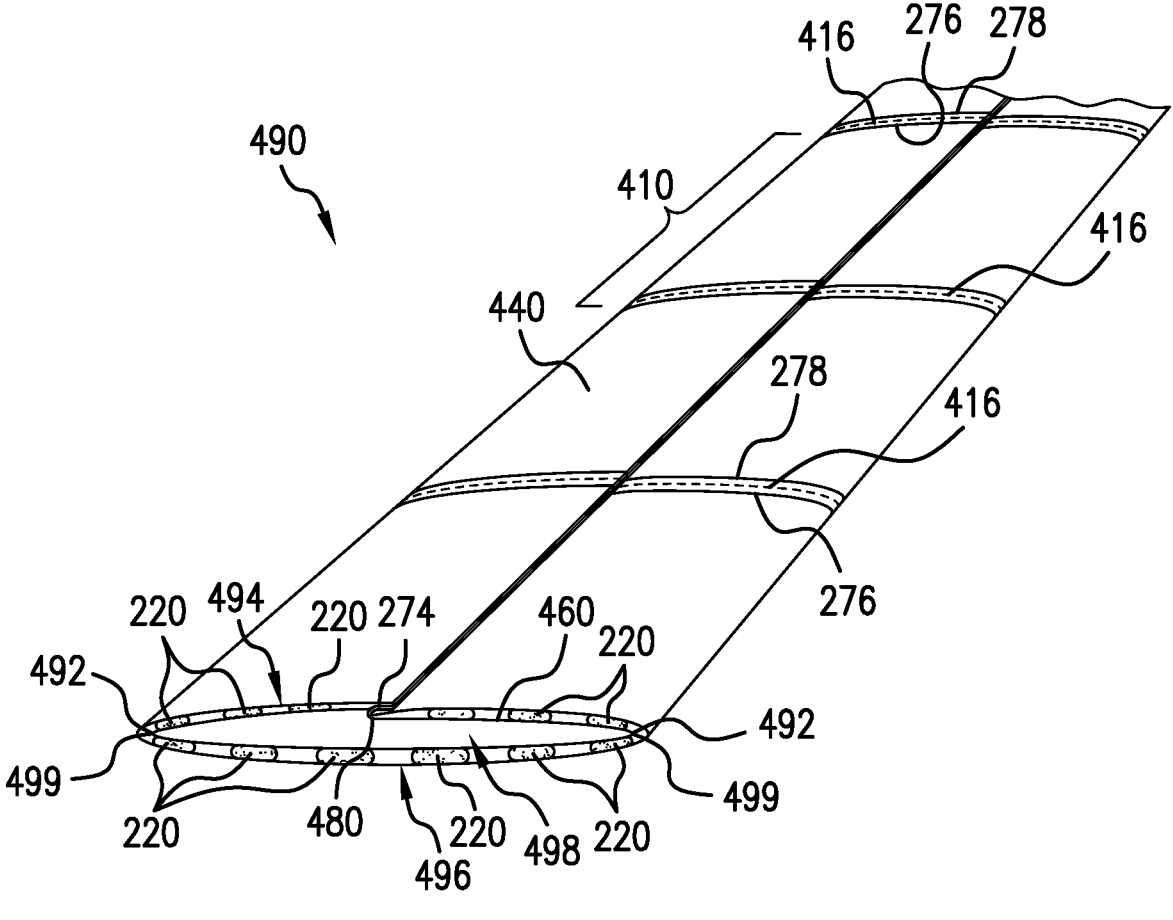
FIG. 8 is a perspective, cross-sectional view of the web of FIG. 7 folded over itself.

Although FIG. 4 depicts wall 170 having a single area 192 about which wall 170 can be folded, other embodiments of the wall can include a plurality of folding areas. For example, the embodiment of FIG. 7 has a wall 470 that has linear areas 55 that have a reduced amount or, or are free from, the expandable composite 220. Due to the decreased, or absence of, the expandable composite, these areas have a resulting lower thickness and less internal structure than padding portions 494, 496, thereby providing natural hinge lines 499 to facilitate folding adjacent portions 494, 496 of wall 470 over each other. In particular, with reference to FIGS. 8-9, padding portions 494 are folded over padding portions 496 along lines 498 such that sealing areas 480 (having sealing material 474 applied over sealing areas 480) of each padding portion 494 meet each other over padding portion 496 to form folded wall 490. In this embodiment, sealing areas 480 of each padding portions 494, 496 meet and then are folded over padding portion 494 and flattened, such that sealing areas 480 join to form a folded spine along the length of web 490 over a central portion of padding portion 496. However, in other embodiments, a sealing area of one padding portion lies on an exterior surface of the padding portion (e.g., along an edge of that padding portion), such that joining the sealing area on an interior surface of one padding portion with an exterior surface of another padding portion can join the padding portions together to form a container cavity without the formation of a central folded spine along the length of the web. Sealing materials 174 can then form a seal to bond, or otherwise secure, sealing area 480, such that padding portions 494, 496 form a container cavity 498 therebetween. Container cavity 498 is further defined between lines 499 and can be even further defined at a later stage upon sealing areas 482, 484 being bonded, or otherwise secured, to each other through sealing materials 276, 278 forming a seal.

System 200 is also configured to forms regions of weakness 116 along folded wall 190 and an opening to access container cavity 398 folded wall 190 (such as opening 117, as shown in FIG. 1). The regions of weakness 116 in this embodiment extend along folded wall 190 in a direction transverse to direction of longitudinal edges 172 to define a length of individual protective packaging units and facilitate separation of packaging units 110 from each other, such as by tearing one unit 110 from the next.

Regions of weakness 116 and the opening can be provided as a line of perforations or slits, a scoring line, or other suitable structure, system 200 can include a cutting apparatus 240 that perforates, scores, and/or cuts, or other suitable device for making the region of weakness. The regions of weakness and openings can be applied prior to, during, or after other portions of the described process. The cutting apparatus 240 can also be used to remove a longitudinal length of one of the plies to make a flap that extends from one wall of a packaging unit (e.g., flap 630 as shown in FIG. 13).

Referring to FIGS. 2, 3, 9, and 10, the cutting apparatus 240 of system 200 includes a blade holder 250 that holds a blade 244, and an anvil, such as roller 242, which can be slotted to receive blade 244, or made of an elastomer or other backing material that can be penetrated by the blade or pushed against by the blade to make the desired cuts and/or scores. Other cutting apparatuses can include stationary or rotary blades, heat-cutters, and/or known mechanisms for cutting folded wall 190. In the embodiment shown, the blade 244 includes a series of spaced teeth 246 configured to puncture completely through all of the wall portions 118, 120 of folded wall 190. Blade 244 cuts entirely through wall portion 120 to form an opening 197 along wall portion 118 transverse to longitudinal edges of folded wall 190. However, blade 244 does not cut entirely through wall portion 120 as teeth 246 of blade 244 includes gaps 248 between each tooth. Teeth 246 and gaps 248 forms a line of perforations as a region of weakness 116 along wall portion 120 transverse to longitudinal edges of folded wall 190. As such, folded web 190 is cut to form a cut web 100 of connected separable packaging units 110.

Figures 9, 10:
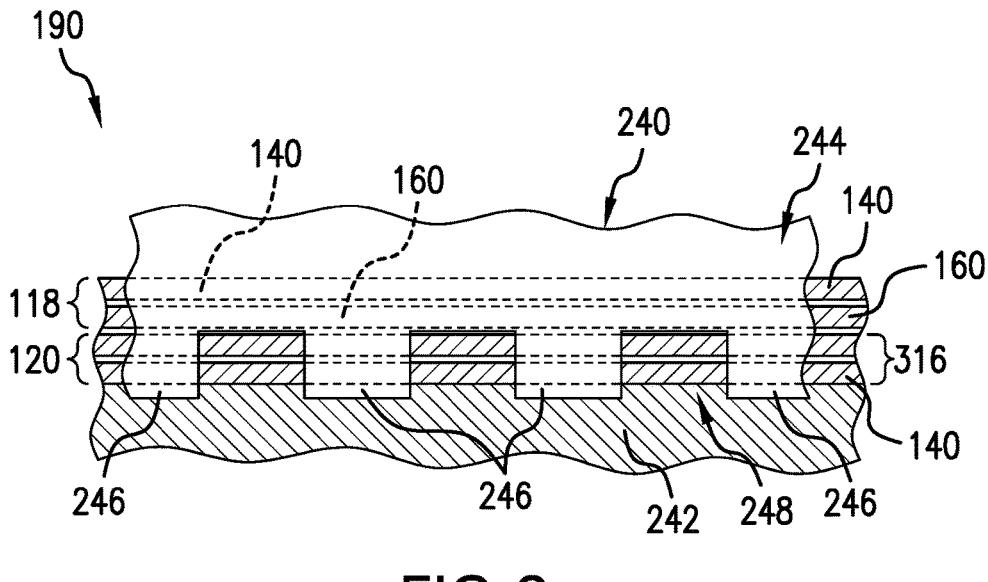
FIG. 9 is a cross-sectional view of the folded web of FIGS. 5-6 in the system of FIGS. 2 and 3 viewed along section plane X-X of FIG. 3.
FIG. 10 is a cross-sectional view of the folded web of FIGS. 5-6 in the system of FIGS. 2 and 3 viewed along section plane XI-XI of FIG. 2.

Although the embodiment in FIG. 10 depicts cutting apparatus 240 cutting opening 117 and regions of weakness 116 through gap 186, in other embodiments, the cutting apparatus cuts the opening and regions of weakness through a different portion of the folded web, such as along a portion of the folded web having a sealing material (e.g., along folded web 190 having sealing material 278) as such a sealing material is not yet activated and can form a top side of a packaging unit. In other embodiments, the blade can cut through the entire folded wall to separate the folded wall into packaging units. In a further alternative, the teeth of the blade can be configured to cut a line of perforation through the entire folded wall to create a region of weakness along both portions of the wall. In a yet further embodiment, the cutting apparatus can include one blade to create an opening along one portion of the folded wall and another blade to create the region of weakness along the other portion of the folded wall at different times or locations in the process.

System 200 includes a consolidating apparatus 252 configured to consolidate cut web 100 into a supply configuration 150, such as a fanfold configuration in this embodiment (or fanfold configuration 150 in FIG. 1). In embodiments in which the system separates each unit from the next, the consolidating apparatus can organize and stack the separated protective packaging units and optionally place them in a container, such as a box or wrapping. In other embodiments, expandable composite 220 within cut web 100 can be expanded prior to being consolidated into a supply configuration, such that the supply configuration includes expanded protective packaging units. In other embodiments, consolidating apparatus 252 includes an expansion device.

Figure 11:
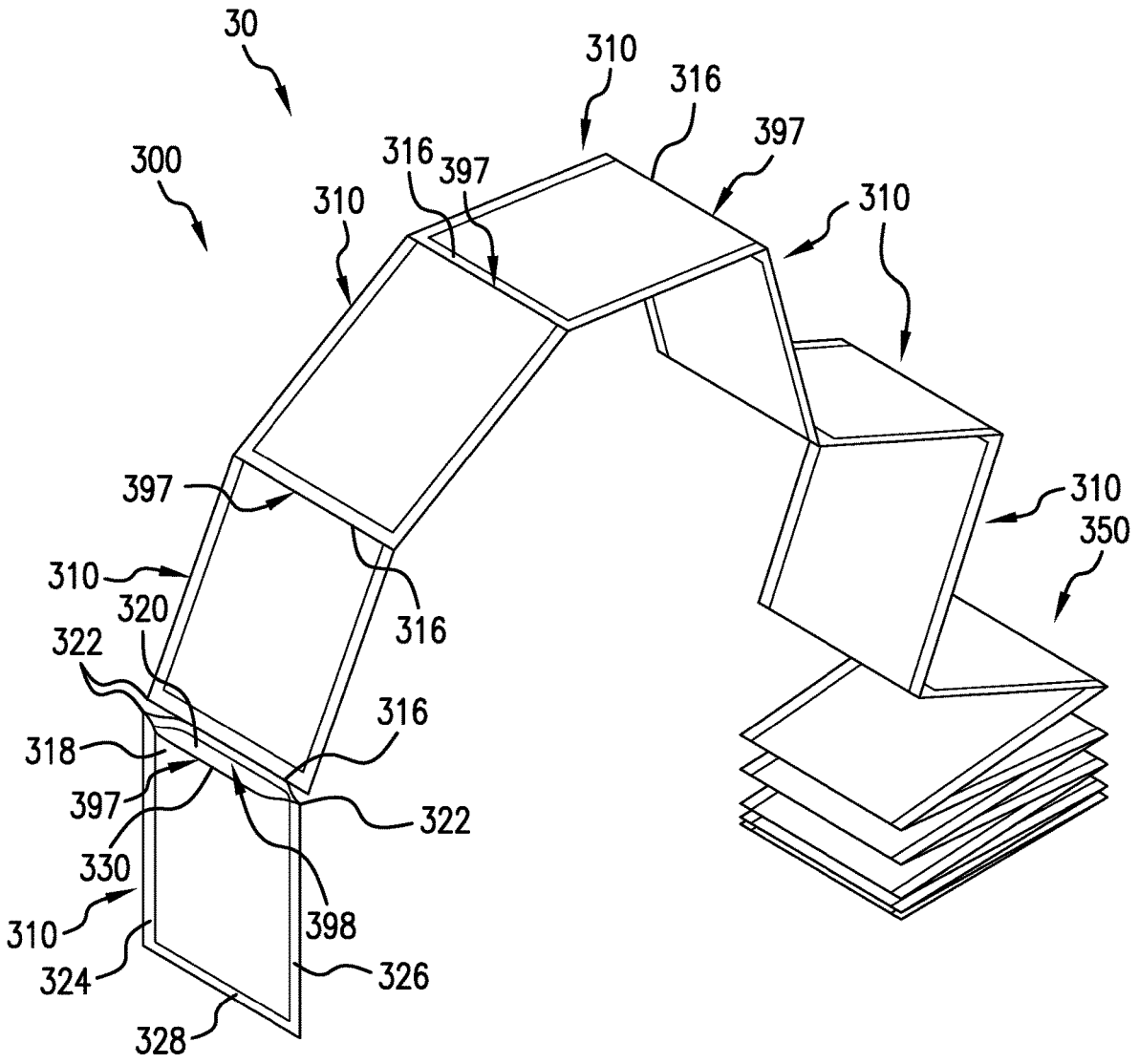
FIG. 11 a perspective view of a web of packaging units in a fan-fold configuration in accordance with another embodiment of the disclosure.

FIG. 11, depicts one example of a supply configuration as a fanfold configuration 350. In this example, fanfold configuration 350 comprises a web 300 of expandable, connected, separable packaging units 310 in a high-density configuration. Packaging units 310 are made of protective packaging walls 318, 120 superimposed on each other along longitudinal side portions 324, 326 and transverse side portions 328 of packaging units 310. Side portions 324, 326, 328 are portions of packaging units 310 where walls 318, 320 are sealed together with a sealing material applied on at least one of the interior surfaces of walls 318, 320 corresponding to those side portions 324, 326, 328, as further described below. Wall 318 is cut along edge 330 such that an opening 397 is defined between wall 318, 320, an edge 330 of wall 318, and longitudinal side portions 324, 326. Opening 397 is provided to allow for an object to be inserted within packaging unit 310 in a top-loading configuration. Packaging units 310 are secured to adjacent packaging units 310 along regions of weakness 316. Packaging units 310 are cut along edge 330 from transverse side portions 324, 326 to form lateral slits 322 along each side of regions of weakness 1316. Such lateral slits 322 facilitate easier opening of opening 397 and easier separation of packaging units 310 from each other. In other embodiments, the web does not have lateral slits and, instead, has a region of weakness along the entire edge for each packaging unit.

Figure 12:
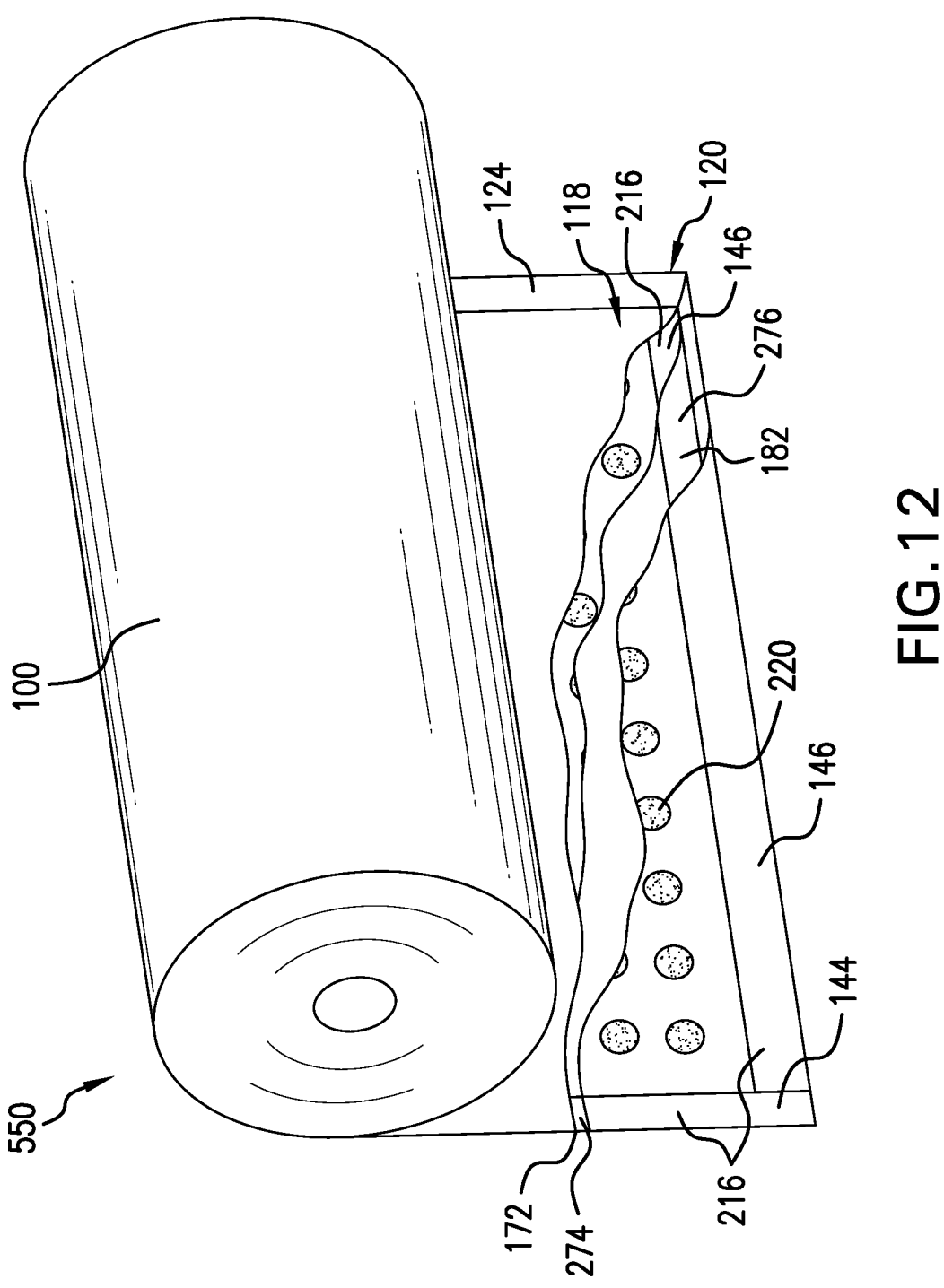
FIG. 12 is a perspective, cutaway view of an embodiment of a supply roll of a web of protective packaging units using the webs of FIG. 1.

FIG. 12 depicts one example of a supply configuration as a roll configuration 550. In this example, roll configuration 550 comprises a roll of web 100 in a high-density configuration. However, other embodiments include the web being rolled in a low-density configuration, where the web is expanded. Roll configuration 550 can be a cored roll configuration or coreless roll configuration.

FIG. 13 depicts an example protective packaging unit 610 in the form of a packaging container, such as a mailer, configured to receive an object for shipping. In contrast with packaging units 110, the walls of packaging unit 610 are not folded over each other to define a container cavity. Instead, protective packaging unit 610 is formed from walls 618, 620 sealed to each other along an interior surface of areas 624, 626, 628 to define a container cavity 698 for storing objects. For example, areas 624, 626, 628 of walls 618, 620 are sealed to each other, such that edges of walls 618, 620 coincide with each other to define a perimeter of packaging unit 610. However, in other embodiments the edges of one wall can extend past the edges of another wall.

Edge 640 of wall 618, opposite area 628 along wall 618, and wall 620 defines an opening 697 between each other such that objects can be top-loaded into container cavity 698. Wall 620 includes a flap 630 extending past edge 640. In this embodiment, flap 630 includes an adhesive surface 634 and a release layer 632 made of a material that adhesive surface 634 does not strongly adhere to. In other embodiments, the flap has cohesive surfaces on the flap and the opposing shorter wall to seal the flap closed, rather than an adhesive surface. In use, after an object is inserted through opening 697 and into container cavity 698, the adhesive surface 634 can be sealed to the outside of wall 620 after the release layer 632 is peeled off and flap 630 is folded over the opening 697. After flap 630 is sealed to wall 618, protective packaging unit 610 is closed over the object received in container cavity 698, thus preventing the object from escaping.

Figure 14:
FIG. 14 is a perspective, cutaway view of a bagging machine that includes an expansion device in accordance with one embodiment of the disclosure.

Referring to FIG. 14, bagging machine 700 is configured to accept a web of connected packaging units in series, such as web 300 of FIG. 11, with the expandable composite in its still expandable state. Bagging machine 700 is fed web 300 from a fanfold stack configuration 350 of connected protective packaging units 310. Bagging machine 700 is configured to receive web 300, move web 300 in a downstream direction, expand web 300 to form an expanded web 380, open each expanded packaging unit 381 along opening 387 in order to access container cavity 388, and insert an object within container cavity 388.

Bagging machine 700 includes an expansion device 706 configured to expand expandable composite 220 housed within walls 318, 320 of web 300 to form expanded web 380. Although FIG. 14 shows expansion device 706 as being positioned immediately downstream of fanfold stack configuration 350, in other embodiments, the expansion device is placed at a different point in the process (e.g., after opening the expanded packaging unit, during insertion of the object within the expanded packaging unit, or subsequent to insertion the object within the expanded packaging unit). In other embodiments, the bagging machine does not include an expansion device where the web from the supply configuration is already expanded. In a yet further embodiment, the bagging machine does not include an expansion device and the web is fed through the bagging machine without being expanded.

To aid in opening 387, bagging machine 700 can include opening aids. As shown in FIG. 14, the opening aids include a plurality of fingers 702 to pinch portions of expanded packaging unit 381, telescopic projections 704 configured to pull portions of expanded packaging unit 381, suction cups 712 to suction a portion of expanded packaging unit 381, and a blower 714 to apply air pressure to opening 387. Although the embodiment shown in FIG. 10 depicts bagging machine 700 including all of fingers 702, telescopic projections 704, suction cups 712, and blower 714 as opening aids, other embodiments can have any combination of opening aids or only one opening aid.

Once opening 387 is opened, an object can be top-loaded into container cavity 398. The filled packaging unit can then be sealed by a sealing apparatus 716, as discussed above, that activates sealing materials 274, 276, 278 to close the filled packaging unit around the object. Sealing apparatus 716 can additionally separate the filled packaging unit from adjacent expanded packaging units 380 by cutting, melting, pulling, tearing, or other suitable means of separating packaging units along regions of weakness 386. However, in other embodiments, bagging machine 700 includes a separate apparatus to separate the filled packaging unit from adjacent packaging units.

Figure 15:
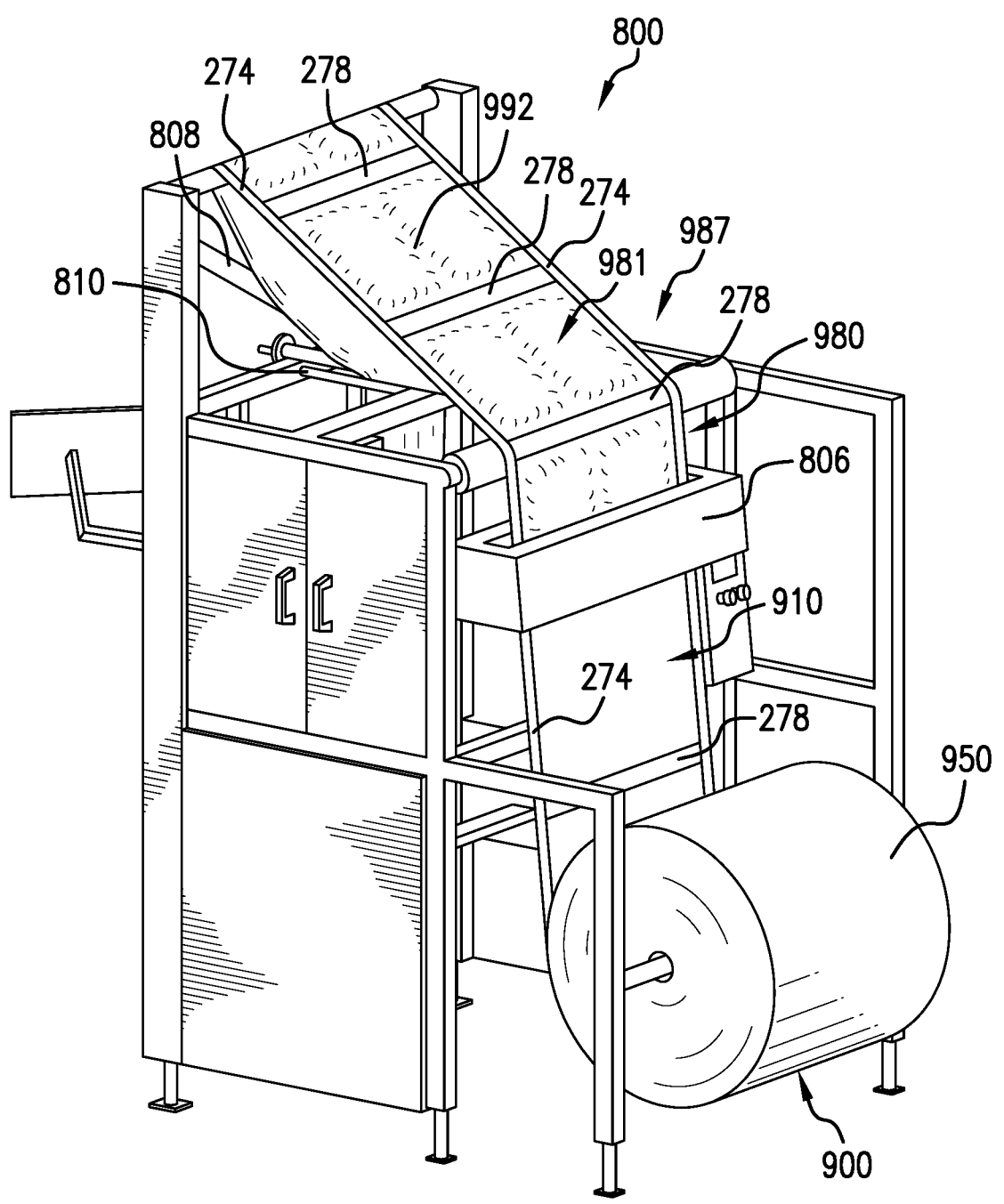
FIGS. 15-16 are front and back perspective views, respectively, of a bagging machine in accordance with another embodiment of the disclosure.
Figure 16:
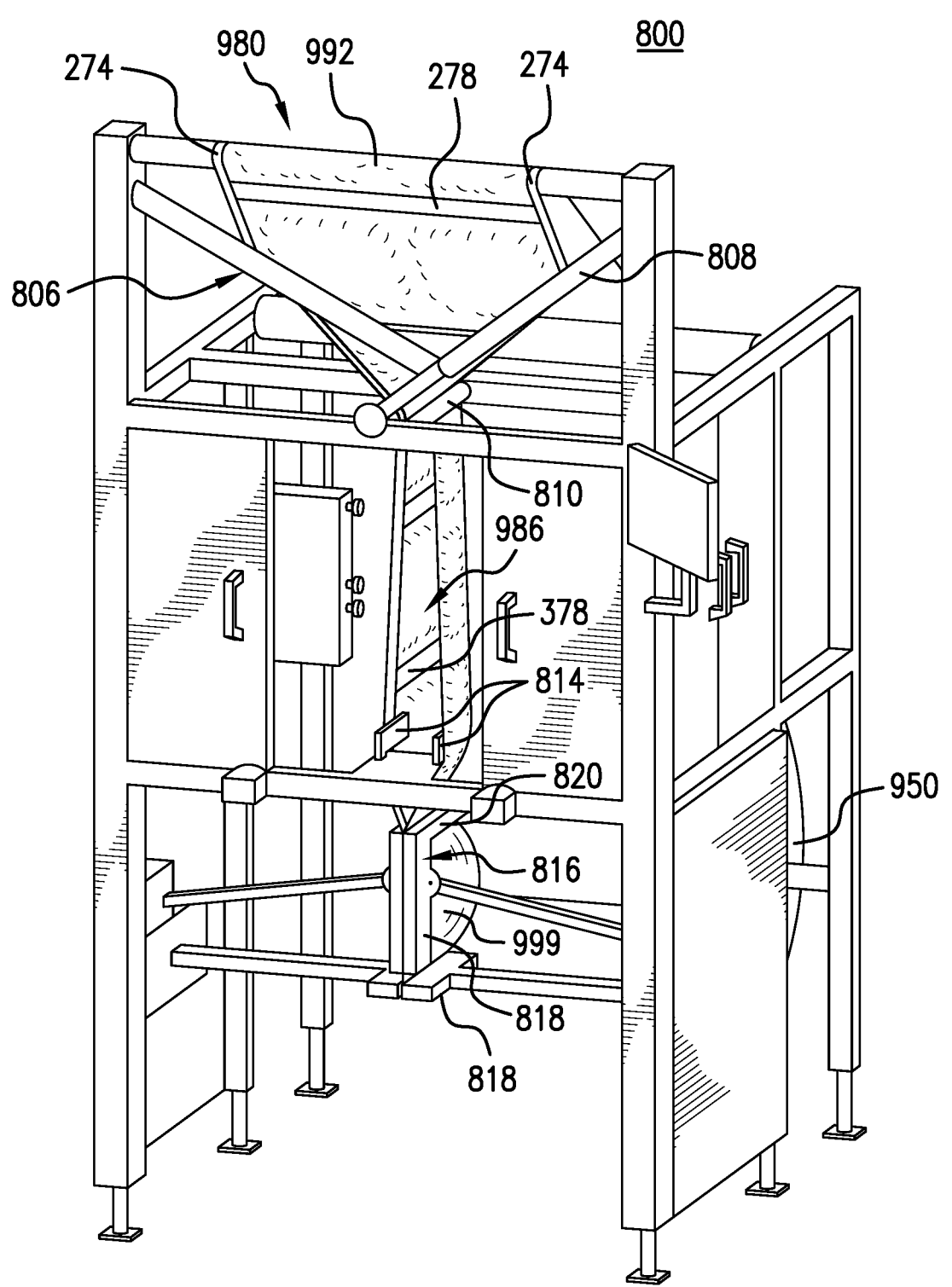

FIG. 15-16 depicts another example bagging machine 800 being fed web 900 of an expandable wall from a supply configuration 950. Bagging machine 800 is configured to receive web 900, move web 900 in a downstream direction, expand folded web 900 to form an expanded web 980, fold expanded web 980 to define an interior container cavity 986, and insert an object within interior cavity 986.

Bagging machine 800 includes an expansion device 806 configured to expand expandable composite 220 housed within a wall of web 900 to form expanded web 980. Although FIG. 15 shows expansion device 806 as being positioned immediately downstream of supply configuration 950, in other embodiments, the expansion device 06 can placed at a different point in the process (e.g., after folding, during insertion of the object within the container cavity, or subsequent to insertion the object within the container cavity).

As shown, expanded web 980 includes areas 992 configured to facilitate folding of expanded web 980 along those sections. Areas 992 can be a portion of expanded web 980 where less or no expandable composite 220 is present, resulting in a natural hinge to facilitate folding of expanded web 980, similar to area 492 as shown in FIG. 7. In another embodiment, the bagging machine includes an apparatus to apply pressure to the web during or subsequent to expansion of the web to form an area of expanded web having a more compressed area of expanded material to facilitate folding expanded web along. In other embodiments, a natural hinge is provided, for instance with a uniform amount of expandable composite extending transversely across the expansion space and the device merely folds the wall web about its center or other desired location to place the wall portions (e.g., padding portions 494, 496 as shown in FIG. 7) over each other to define a container cavity.

Bagging machine 800 includes a folding apparatus 806 configured to fold expanded web 980. Folding apparatus 806 can include bars 808, 810, or other another suitable mechanism, that folds expanded web 980 to define interior container cavity 986 within expanded web 980. Folding apparatus 806 C-folds the web 980, but other known types of folding can alternatively be employed. Bagging machine 800 includes a hold-open member, such as fingers 814 or other suitable devices, that holds the container cavity open within the opposing walls of the folded expanded web, providing a transversely facing container interior cavity 312 for sideloading with an object to.

Bagging machine 100 includes a sealing apparatus 816 to activate sealing materials 274, 278 to seal expanded packaging unit 981. Sealing apparatus 116 is configured to apply heat, pressure, and/or other suitable means of setting sealing materials 274, 278 to form a completed bag. For example, where the sealing materials are strip-seals, sealing apparatus applies heat to activate the sealing materials.

Sealing apparatus 816 includes a transverse sealing apparatus 820 and a longitudinal sealing apparatus 818. Transverse sealing apparatus 820 is configured to activate sealing material 278 after expanded packaging unit 981 is folded to seal off a bottom side of one expanded packaging unit 981, defining a bottom boundary of container cavity 986, and a top side of an adjacent expanded packaging unit 981. Longitudinal sealing apparatus 818 is configured to activate sealing material 274 to seal off a side boundary of expanded packaging unit 981 and to define a side boundary of container cavity 986. In this manner, longitudinal sealing apparatus 818 seals closed a completed bag 999 after an object is inserted within container cavity 986.

In other embodiments, the bagging machine does not include an expansion device where the web from the supply configuration is already expanded. In a yet further embodiment, the bagging machine does not include an expansion device and the web is fed through the bagging machine without being expanded.

Bagging machine 800 includes a separating mechanism 818 configured to facilitate separation of the completed bag from expanded web 980, similar to the separation means as discussed above for bagging machine 700. In one embodiment, the sealing apparatus can melt through the top boundary of the completed bag and the separating mechanism can pull the completed bag apart from an adjacent packaging unit.

Although bagging machines 700, 800 are depicted as being fed from a particular unexpanded, high-density configuration (e.g., fanfold stack configuration 150 or roll configuration 550), it is understood that that either machine 700, 800 can be fed from either types of consolidated configuration. In other embodiments, the webs can be fed entirely through bagging machines 700, 800 without being expanded.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is also to be understood that the terminology used herein is for describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A protective article, comprising:

first and second walls, each of which includes:

superimposed plies enclosing an expansion space therebetween, and an expandable composite disposed in the expansion space, the expandable composite comprising:

a biodegradable matrix, wherein the biodegradable matrix comprises a biodegradable polymer, a biodegradable adhesive, or a combination thereof, and a plurality of cellulose-based expandable microspheres configured to cause the biodegradable matrix to expand upon activation of the cellulose-based expandable microspheres, wherein the cellulose-based expandable microspheres contain more than 50% of cellulose based on the total weight of the cellulose-based expandable microspheres, wherein the expandable composite contains more than 50% of cellulose based on the total weight of the expandable composite, wherein the biodegradable polymer comprises natural starch, synthetic starch, cellulose, biopolyesters, proteins, polysaccharides, or a combination thereof, wherein the biodegradable adhesive comprises a starch-based adhesive, a cellulose-based adhesive, a biopolyester-based adhesive, a protein-based adhesive, a polysaccharide-based adhesive, or a combination thereof, wherein the first and second walls are superimposed on each other to define a container cavity therebetween configured and dimensioned to contain therein a product to be shipped, wherein the expansion spaces of the walls are superimposed on each other about the container cavity, wherein the first and second walls are connected to each other on a plurality of sides of the container cavity, and wherein the expandable composite is disposed in the expansion spaces in the form of a pattern comprising regular or irregular shapes, in the form of a continuous or discontinuous layer, and/or at one or more discrete regions and exhibits uniform or varying thicknesses or widths for providing cushioning to a product contained in the container cavity.

2. The protective article of claim 1, wherein:

the walls are unsealed to each other at an open side of the container cavity, which open side is dimensioned to allow insertion of a product therethrough into the container cavity; and the protective article further comprising a closure on the first wall configured for sealing the first wall to the second wall to seal closed the open side to retain a product in the cavity.

3. The protective article of claim 2, further comprising a web that includes the first and second walls connected to each other in a series of locations transversely across the web to define a plurality of connected protective packaging units configured to be separated from each other, each of the packaging units including a pair of the expansion spaces superimposed over each other about at least one container cavity.

4. The protective article of claim 1, wherein the biodegradable polymer comprises cellulose.

5. The protective article of claim 1, wherein the biodegradable adhesive is a cellulose-based adhesive.

6. The protective article of claim 1, wherein the biodegradable adhesive is a starch-based adhesive.

7. The protective article of claim 1, wherein the cellulose-based expandable microspheres comprise a blowing agent.

8. The protective article of claim 1, wherein the cellulose-based expandable microspheres comprise a reactive component, a chemical catalyst, or a combination thereof.

9. The protective article of claim 7, wherein the blowing agent comprises air, carbon dioxide, nitrogen, methane, ethane, propane, isobutane, n-butane, neo-pentane, inert gas, or a combination thereof.

10. The protective article of claim 1, wherein the cellulose-based expandable microspheres comprise an outer shell and an inner core material, and wherein the outer shell comprises cellulose.

11. The protective article of claim 1, wherein the cellulose-based expandable microspheres comprise a hydrocarbon, water or a combination thereof.

12. The protective article of claim 1, wherein the cellulose-based expandable microspheres are configured to be activated thermally.

13. The protective article of claim 1, wherein the activation causes the cellulose-based expandable microspheres to expand, thereby expanding the biodegradable matrix.

14. The protective article of claim 1, wherein the biodegradable matrix is configured to solidify after expanding.

15. The protective article of claim 1, wherein the plies comprise biodegradable materials, and the protective article as a whole is made of at least 75% by weight of a biodegradable material.

16. The protective article of claim 1, wherein the microspheres are entrained in the biodegradable matrix.

17. A protective article, comprising a first wall that includes:

a first ply defining an expansion area, and an expandable composite in the expansion area, the expandable composite comprising:

a biodegradable matrix, wherein the biodegradable matrix comprises a biodegradable polymer, a biodegradable adhesive, or a combination thereof; and a plurality of cellulose-based expandable microspheres configured to cause the biodegradable matrix to expand upon activation of the cellulose-based expandable microspheres, wherein the cellulose-based expandable microspheres contain more than 50% of cellulose based on the total weight of the cellulose-based expandable microspheres, wherein the expandable composite contains more than 50% of cellulose based on the total weight of the expandable composite, wherein the biodegradable polymer comprises natural starch, synthetic starch, cellulose, biopolyesters, proteins, polysaccharides, or a combination thereof, and wherein the biodegradable adhesive comprises a starch-based adhesive, a cellulose-based adhesive, a biopolyester-based adhesive, a protein-based adhesive, a polysaccharide-based adhesive, or a combination thereof.

18. The protective article of claim 17, wherein the first wall includes a second ply superimposed on and connected to the first ply, such that the first and second plies define therebetween a first expansion space enclosing the expansion area, wherein the expandable composite is contained in the first expansion space.

19. The protective article of claim 18, further comprising a second wall that includes:

opposing substrate plies superimposed on, and connected to, each other to define a second expansion space therebetween; and an additional amount of the expandable composite contained in the second expansion space;

wherein the first and second walls are superimposed on each other to define a container cavity therebetween configured and dimensioned to contain therein a product to be shipped, wherein the expansion spaces of the walls are superimposed on each other about the container cavity, and wherein the first and second walls are connected to each other on a plurality of sides of the container cavity.

20. An expandable web comprising:

a first ply;

a second ply; and an expandable composite in an expansion area between the first and second plies, the expandable composite comprising:

a biodegradable matrix, wherein the biodegradable matrix comprises a biodegradable polymer, a biodegradable adhesive, or a combination thereof; and a plurality of cellulose-based expandable microspheres configured to cause the biodegradable matrix to expand upon activation of the cellulose-based expandable microspheres, wherein the cellulose-based expandable microspheres contain more than 50% of cellulose based on the total weight of the cellulose-based expandable microspheres, wherein the expandable composite contains more than 50% of cellulose based on the total weight of the expandable composite, where in the biodegradable polymer comprises natural starch, synthetic starch, cellulose, biopolyesters, proteins, polysaccharides, or a combination thereof, and wherein the biodegradable adhesive comprises a starch-based adhesive, a cellulose-based adhesive, a biopolyester-based adhesive, a protein-based adhesive, a polysaccharide-based adhesive, or a combination thereof.

21. The expandable web of claim 20, wherein the first ply and the second ply each is made of at least 75% by weight of a biodegradable material.

22. A method for making an expandable protective article, comprising:

applying an expandable composite onto the surface of a first ply, the expandable composite comprising:

a biodegradable matrix, wherein the biodegradable matrix comprises a biodegradable polymer, a biodegradable adhesive, or a combination thereof, and a plurality of cellulose-based expandable microspheres configured to cause the biodegradable matrix to expand upon activation of the cellulose-based expandable microspheres;

wherein the cellulose-based expandable microspheres contain more than 50% of cellulose based on the total weight of the cellulose-based expandable microspheres, wherein the expandable composite contains more than 50% of cellulose based on the total weight of the expandable composite, wherein the biodegradable polymer comprises natural starch, synthetic starch, cellulose, biopolyesters, proteins, polysaccharides, or a combination thereof, and wherein the biodegradable adhesive comprises a starch-based adhesive, a cellulose-based adhesive, a biopolyester-based adhesive, a protein-based adhesive, a polysaccharide-based adhesive, or a combination thereof; and applying a second ply over the first ply such that the expandable composite is sandwiched between the first ply and the second ply.

* * * * *